United States Patent
Tsuruoka

(10) Patent No.: US 8,532,376 B2
(45) Date of Patent: Sep. 10, 2013

(54) SIGNAL PROCESSING SYSTEM AND COMPUTER READABLE MEDIUM FOR RECORDING SIGNAL PROCESSING PROGRAM

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 856 days.

(21) Appl. No.: 12/504,202

(22) Filed: Jul. 16, 2009

(65) Prior Publication Data

US 2010/0014753 A1  Jan. 21, 2010

(30) Foreign Application Priority Data

Jul. 18, 2008  (JP) ................................. 2008-187692

(51) Int. Cl.
*G06K 9/00*  (2006.01)

(52) U.S. Cl.
USPC ........................................................ 382/165

(58) Field of Classification Search
USPC ........................................................ 382/165
See application file for complete search history.

(56) References Cited

U.S. PATENT DOCUMENTS

| | | | |
|---|---|---|---|
| 4,885,634 A | 12/1989 | Yabe | |
| 5,550,582 A | 8/1996 | Takasugi et al. | |
| 5,995,645 A | 11/1999 | Soenksen et al. | |
| 6,750,964 B2 * | 6/2004 | Levenson et al. | 356/326 |
| 7,136,518 B2 * | 11/2006 | Griffin et al. | 382/133 |
| 7,321,791 B2 | 1/2008 | Levenson et al. | |
| 7,720,272 B2 * | 5/2010 | Armogida | 382/133 |
| 7,916,943 B2 * | 3/2011 | Ohara et al. | 382/168 |
| 2004/0202356 A1 | 10/2004 | Stookey et al. | |
| 2007/0153370 A1 * | 7/2007 | Olszak et al. | 359/368 |
| 2008/0079803 A1 | 4/2008 | Sekiguchi | |
| 2008/0194972 A1 | 8/2008 | Gono | |
| 2008/0212865 A1 * | 9/2008 | Zhu et al. | 382/133 |
| 2009/0023991 A1 | 1/2009 | Gono et al. | |
| 2009/0058999 A1 | 3/2009 | Gono et al. | |

(Continued)

FOREIGN PATENT DOCUMENTS

| | | |
|---|---|---|
| EP | 1 880 658 A1 | 1/2008 |
| JP | 6-335451 A | 12/1994 |

(Continued)

OTHER PUBLICATIONS

Extended European Search Report dated Nov. 3, 2010 (in English) in counterpart European Application No. 09009352.7.

(Continued)

*Primary Examiner* — Jingge Wu

(74) *Attorney, Agent, or Firm* — Holtz, Holtz, Goodman & Chick, PC

(57) ABSTRACT

A base vector acquisition unit acquires a base vector based on spectral characteristics of a subject to be an identification object with spectral characteristics known, and a system spectral characteristics acquisition unit acquires a spectral characteristics of an image acquisition system including spectral characteristics concerning a color imaging system provided for image acquisition of subjects including the subject to be identification object, and spectral characteristics concerning illumination light used in image acquisition of subjects by the color imaging system. A calculation unit calculates weighting coefficient concerning the base vector for each wavelength area, from image signal composed of a plurality of color signals obtained in the color imaging system, the base vector and spectral characteristics of the image acquisition system. An output signal calculation unit calculates an output signal as identification result of the subject to be identification object based on the weighting coefficients.

13 Claims, 16 Drawing Sheets

(56) References Cited

U.S. PATENT DOCUMENTS

| | | | |
|---|---|---|---|
| 2009/0096889 | A1 | 4/2009 | Tsuruoka |
| 2009/0202131 | A1* | 8/2009 | Armogida .................... 382/133 |
| 2010/0014753 | A1 | 1/2010 | Tsuruoka |
| 2010/0094136 | A1 | 4/2010 | Nakaoka et al. |

FOREIGN PATENT DOCUMENTS

| | | |
|---|---|---|
| JP | 2003-93336 A | 4/2003 |
| JP | 2005-181276 A | 7/2005 |
| JP | 2006-314557 A | 11/2006 |
| JP | 2006-341077 A | 12/2006 |
| JP | 2006-341078 A | 12/2006 |
| JP | 2007-111357 A | 5/2007 |
| JP | 2008-128982 A | 6/2008 |
| JP | 2008-161550 A | 7/2008 |
| JP | 2009-285084 A | 12/2009 |
| WO | WO 2006/120798 A1 | 11/2006 |
| WO | WO 2007/148576 A1 | 12/2007 |

OTHER PUBLICATIONS

Ruifrok A C et al.: "Quantification of Histochemical Staining by Color Deconvolution": Analytical and Quantitative Cytology and Histology: vol. 23, No. 4: (Aug. 1, 2001): pp. 291-299: ISSN: 0884-6812.

Bautista P A et al.: "Digital Staining of Unstained Pathological Tissue Samples through Spectral Transmittance Classification": Optical Review: vol. 12, No. 1: (Jan. 1, 2005): pp. 7-14: ISSN: 1349-9432.

Zimmermann T et al.: "Spectral Imaging and its Applications in Live Cell Microscopy": FEBS Letters: vol. 546, No. 1: (Jul. 3, 2003): pp. 87-92: ISSN: 0014-5793.

Connah D et al.: "A Computational Model for the Design of a Multispectral Imaging System": Proceedings of IS&T/SID 9th Color Imaging Conference: (2001): pp. 130-134.

Nakamura K: "Development of Real-Time Endoscopic Image Processing Technology: Adaptive Index of Hemoglobin Color Enhancement Processing": Digestive Endoscopy: vol. 14: (2002): pp. S40-S47.

Garini Y et al: "Spectral Imaging: Principles and Applications": Cytometry Part A: vol. 69A: (2006): pp. 735-747.

Japanese Office Action dated Jan. 11, 2011 (and English translation thereof) in counterpart Japanese Application No. 2008-187692.

U.S. Appl. No. 12/953,740; First Named Inventor: Takao Tsuruoka: Title: "Signal Processing System and Signal Processing Program"; Filed Nov. 24, 2010.

Breiteenbach Karl-Heniz: "MS-DOS and MS-Windows are PC Standards": Computer Standards & Interfaces 8 (1988). pp. 41-44.

International Preliminary Report on Patentability (IPRP) dated Jan. 20, 2011 in International Application No. PCT/JP2009/059551.

International Search Report and Written Opinion dated Aug. 18, 2009 (in English) in counterpart International Application No. PCT/JP2009/059551.

Extended European Search Report (EESR) dated May 30, 2012 (in English) in counterpart European Application No. 09754665.9.

* cited by examiner

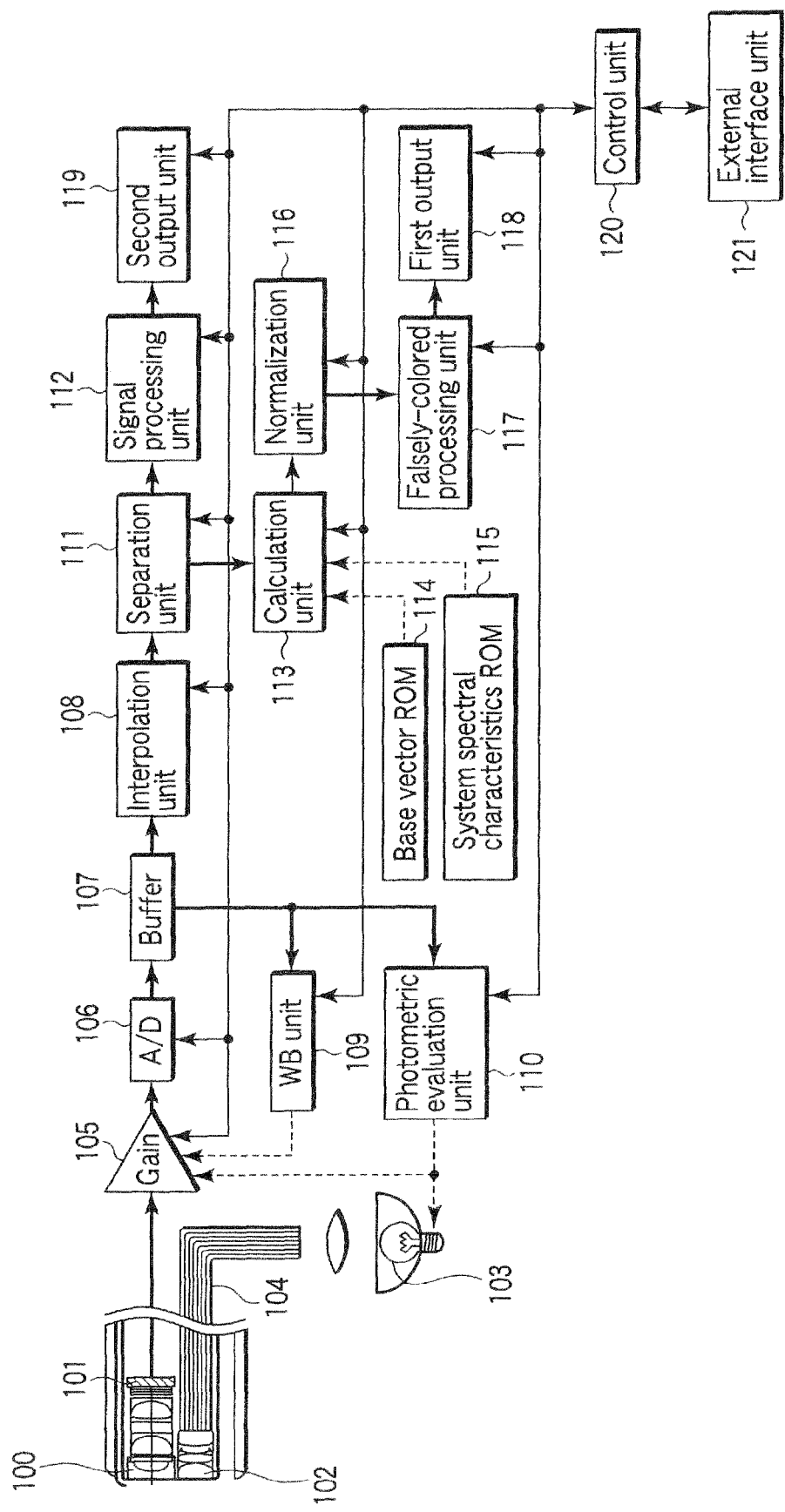
F I G. 1

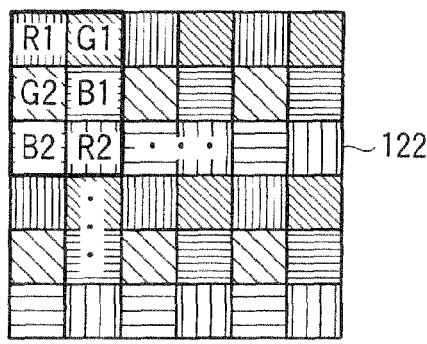
F I G. 2
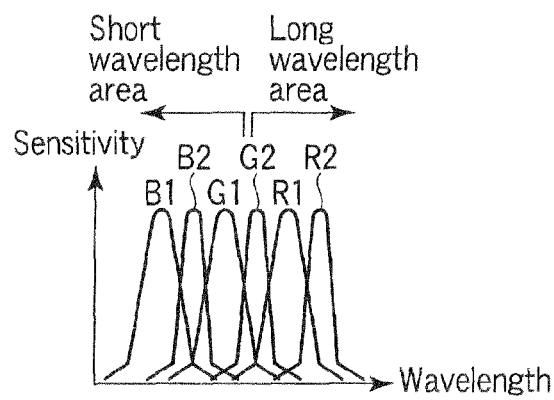
F I G. 3
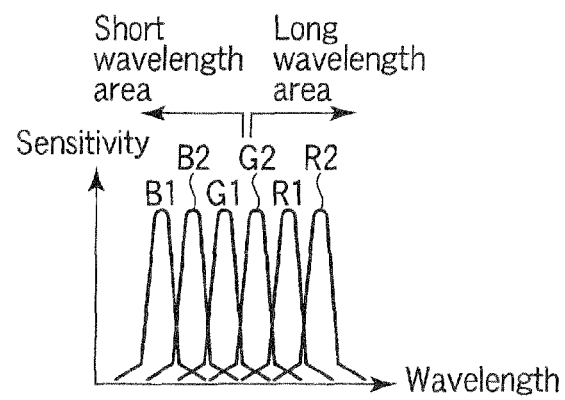
F I G. 8
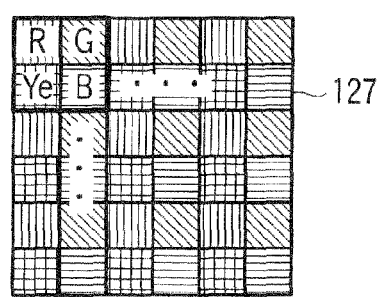
F I G. 13
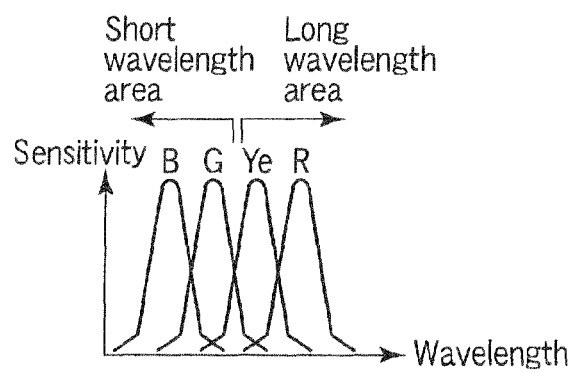
F I G. 14

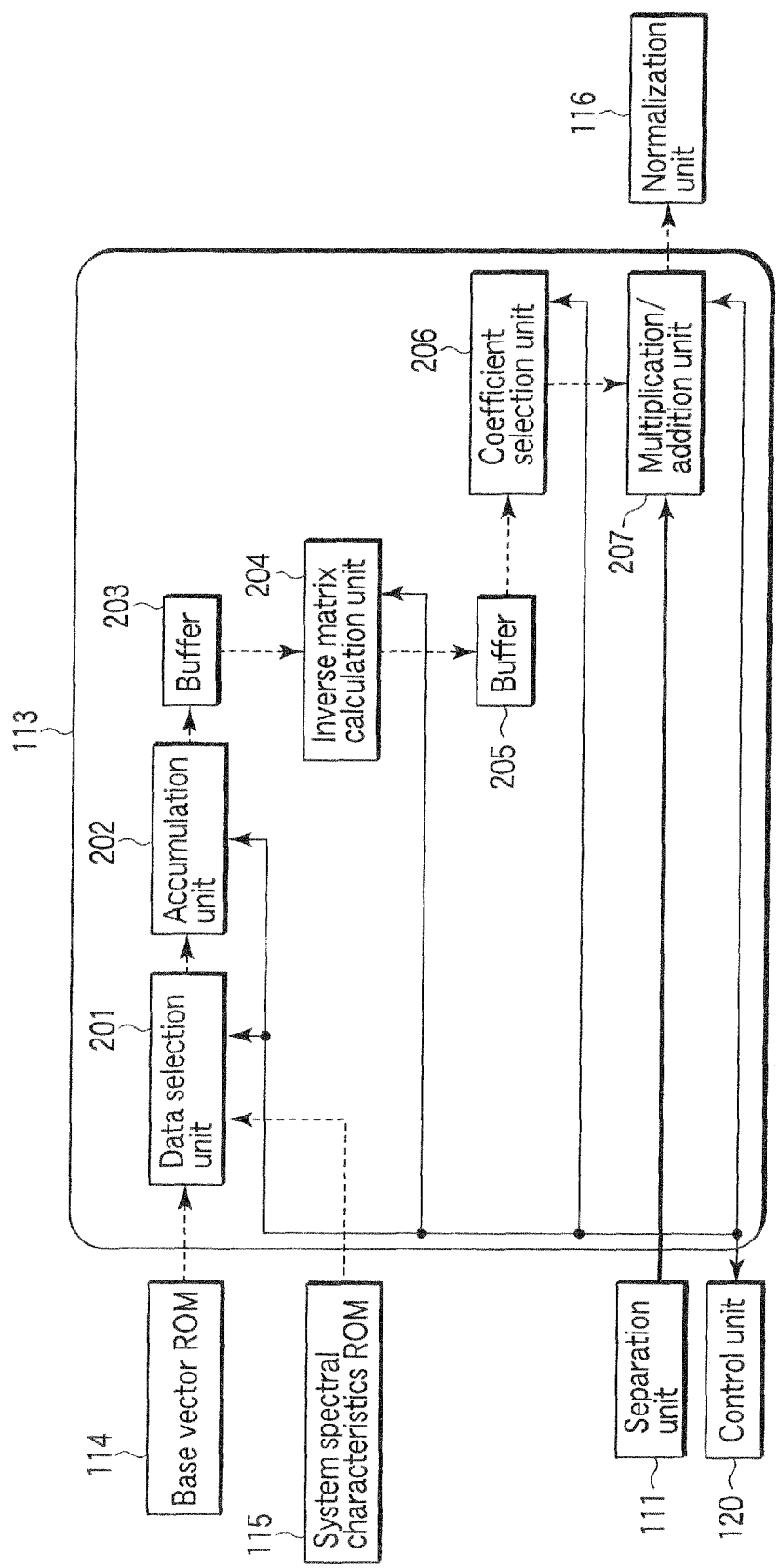
F I G. 4

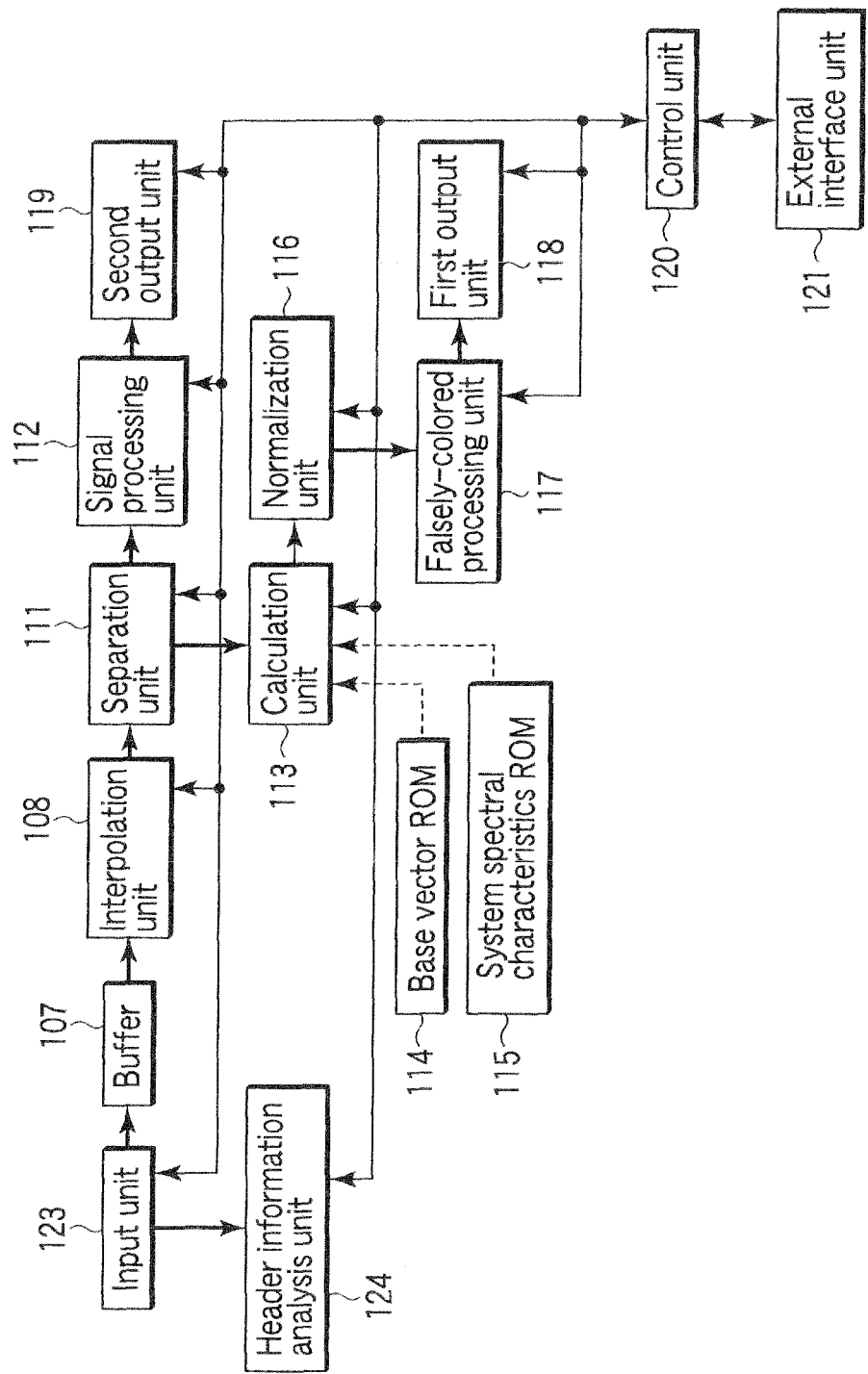
F I G. 9

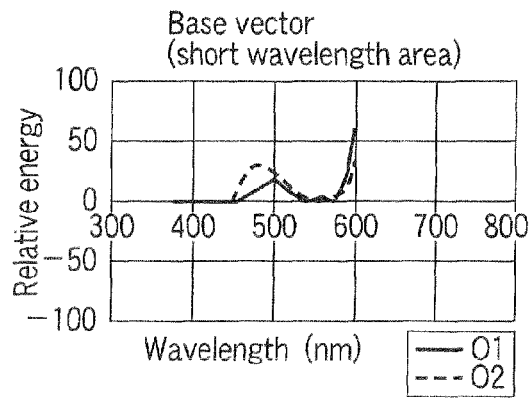
F I G. 15A
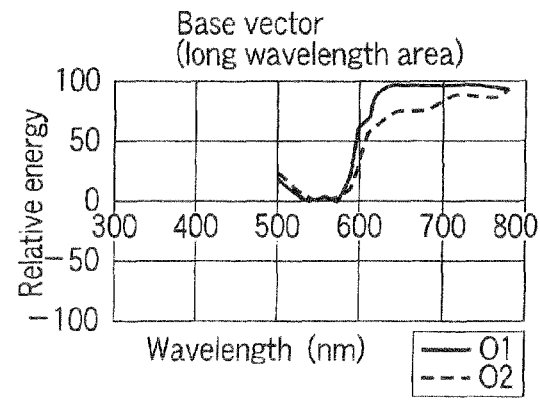
F I G. 15B
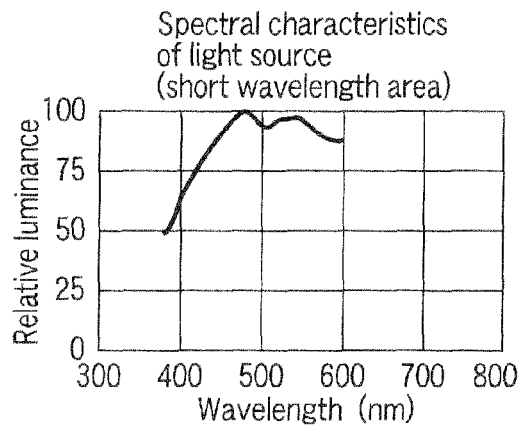
F I G. 16A
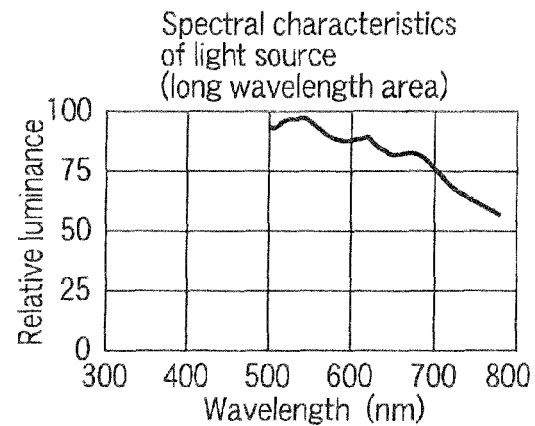
F I G. 16B
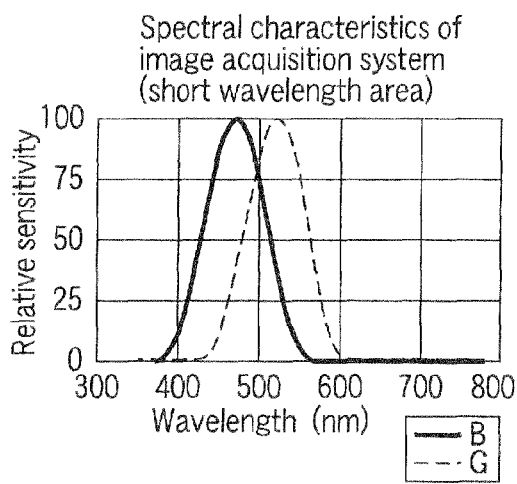
F I G. 17A
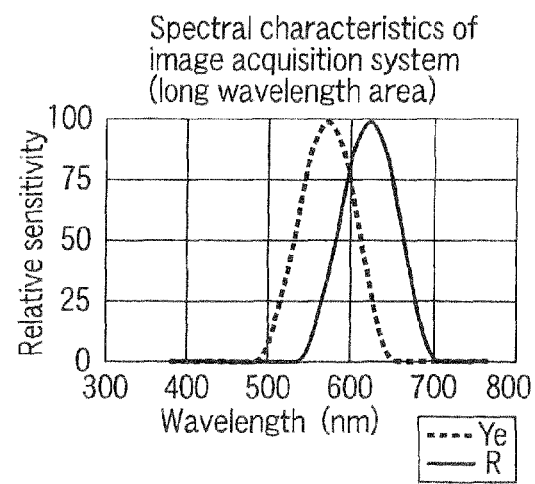
F I G. 17B

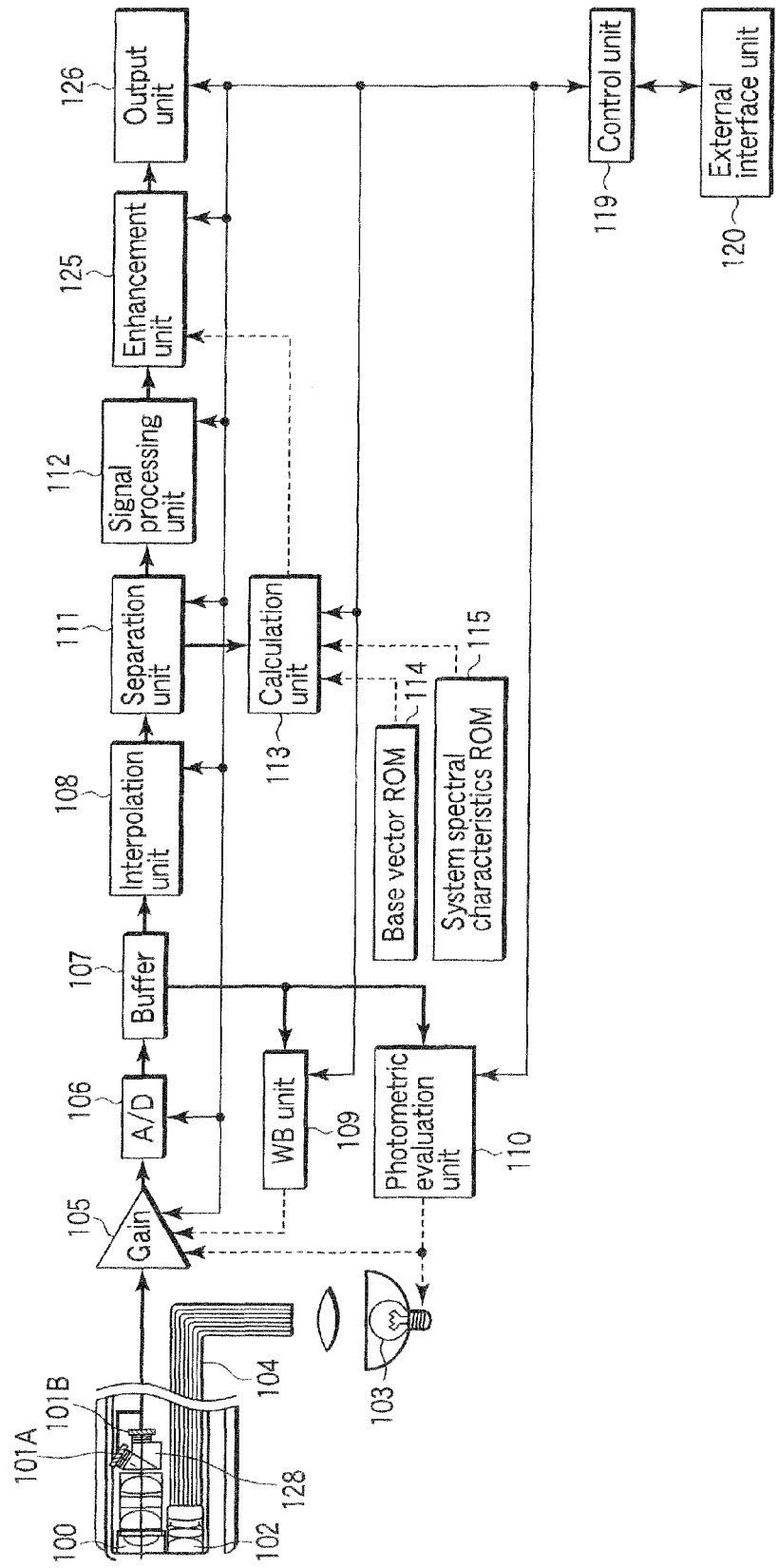
F I G. 20

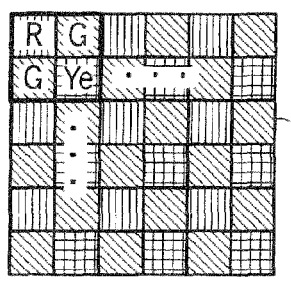
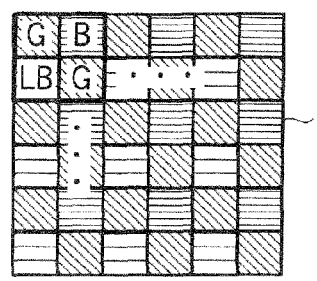
F I G. 21A      F I G. 21B
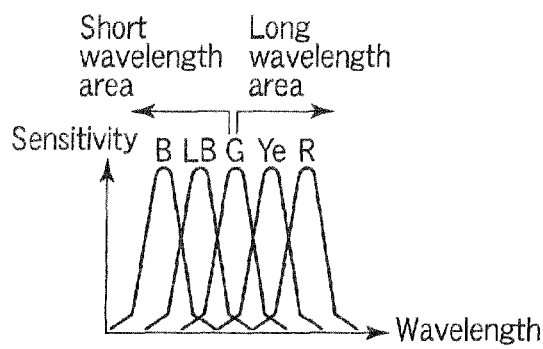
F I G. 22
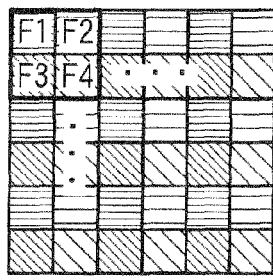
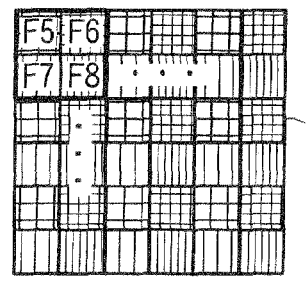
F I G. 23A      F I G. 23B
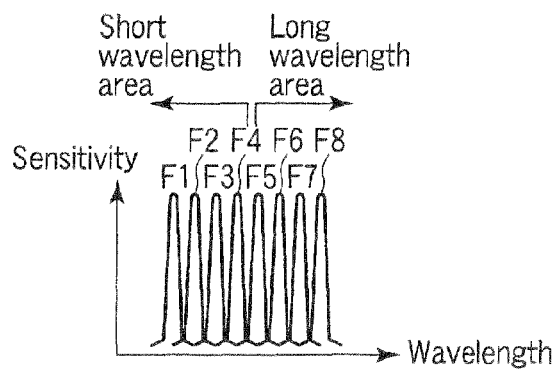
F I G. 24

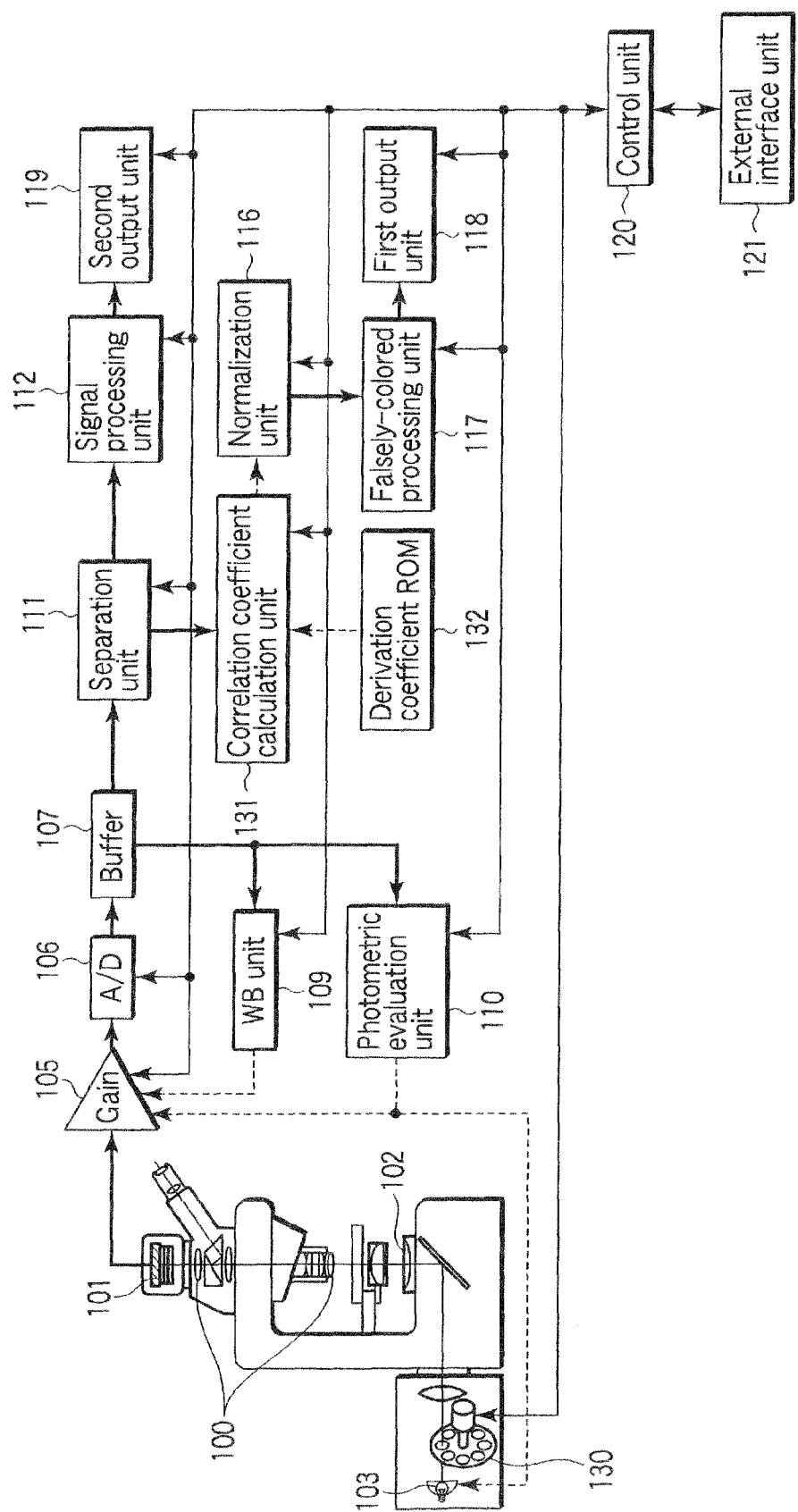
F I G. 27

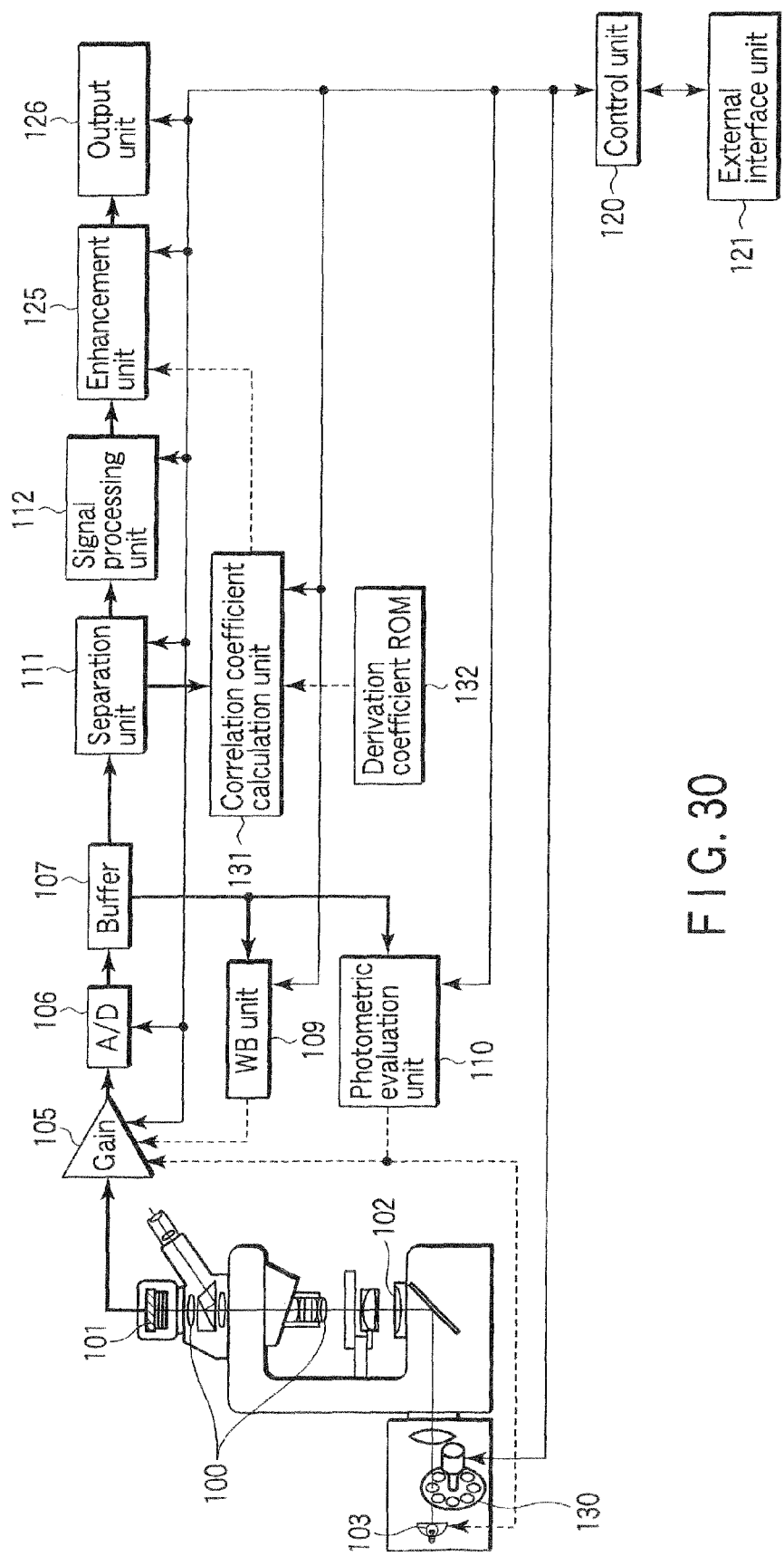
F I G. 30

SIGNAL PROCESSING SYSTEM AND COMPUTER READABLE MEDIUM FOR RECORDING SIGNAL PROCESSING PROGRAM

CROSS-REFERENCE TO RELATED APPLICATIONS

This application is based upon and claims the benefit of priority from prior Japanese Patent Application No. 2008-187692, filed Jul. 18, 2008, the entire contents of which are incorporated herein by reference.

BACKGROUND OF THE INVENTION

1. Field of the Invention

The present invention relates to a signal processing system performing identification of a subject and a computer readable medium for recording a signal processing program permitting a computer to execute procedures of such a signal processing system.

2. Description of the Related Art

Jpn. Pat. Appln. KOKAI Publication No. 2003-93336 has disclosed an example calculating an image signal of a specific narrow band by signal processing by using broadband light as observation light. Thereby, since a high quality narrowband image signal with less noise is obtained, it is possible to display a subject on a display monitor while identifying the subject having specific spectral characteristics, such as blood vessel, and accordingly, the observation of the subject to be an identification object is facilitated.

BRIEF SUMMARY OF THE INVENTION

According to a first aspect of the present invention, there is provided a signal processing system comprising:

a base vector acquisition unit configured to perform an acquisition of a base vector based on spectral characteristics of a subject to be an identification object with spectral characteristics known;

a separation unit configured to separate an image signal, which is composed of a plurality of color signals obtained by a color imaging system provided for subjects including the subject to be the identification object, into image signals of a plurality of wavelength areas based on the plurality of color signals;

a system spectral characteristics acquisition unit configured to perform an acquisition of spectral characteristics of an image acquisition system including spectral characteristics concerning the color imaging system and spectral characteristics concerning illumination light used in image acquisition of subjects by the color imaging system;

a calculation unit configured to calculate a weighting coefficient concerning the base vector for the each wavelength area, based on the image signals of the plurality of wavelength areas separated by the separation unit, the base vector acquired by the base vector acquisition unit, and the spectral characteristics of the image acquisition system acquired by the system spectral characteristics acquisition unit; and an output signal calculation unit configured to calculate an output signal as identification result of subject to be identification objects with the spectral characteristics known, based on the weighting coefficient concerning base vector for the each wavelength area calculated in the calculation unit.

Meanwhile, acquisition means reading the data from a recording medium, reading the data via a network, or the like, besides taking an image by real time.

According to a second aspect of the present invention, there is provided a signal processing system comprising:

a separation unit configured to separate an image signal, which is composed of a plurality of color signals obtained by a color imaging system provided for subjects including a subject to be an identification object with spectral characteristics known, into image signals of a plurality of wavelength areas based on the plurality of color signals; and a derivation coefficient acquisition unit configured to perform an acquisition of a derivation coefficient indicating correlativity between the known spectral characteristics of the subject to be the identification object and image signal of respective wavelength areas for the each wavelength area. Here, the derivation coefficient is calculated based on the known spectral characteristics of the subject to be the identification object, spectral characteristics concerning the color imaging system, and spectral characteristics concerning illumination light used in image acquisition of subjects by the color imaging system.

The signal processing system further comprises:

a correlation coefficient calculation unit configured to calculate a correlation coefficient between the known spectral characteristics of the subject to be the identification object and image signal of the wavelength area for the each wavelength area, based on the image signals of the plurality of wavelength areas separated in the separation unit and the derivation coefficient acquired by the derivation coefficient acquisition unit; and an output signal calculation unit configured to calculate an output signal as identification result of subject to be identification object with the spectral characteristics known, based on the correlation coefficient for the each wavelength area calculated by the correlation coefficient calculation unit.

According to a third aspect of the present invention, there is provided a computer readable medium for recording a signal processing program, causing a computer to execute:

performing an acquisition of an image signal composed of a plurality of color signals obtained by a color imaging system provided for subjects including a subject to be an identification object with spectral characteristics known;

performing an acquisition of a base vector based on spectral characteristics of the subject to be the identification object with spectral characteristics known;

separating the acquired image signal into image signals of a plurality of wavelength areas based on the plurality of color signals;

performing an acquisition of spectral characteristics of an image acquisition system including spectral characteristics concerning the color imaging system and spectral characteristics concerning illumination light used in image acquisition of subjects by the color imaging system;

calculating a weighting coefficient concerning the base vector for the each wavelength area, based on the separated image signals of the plurality of wavelength areas, the acquired base vector, and the acquired spectral characteristics of the image acquisition system; and calculating an output signal as identification result of subject to be identification objects with the spectral characteristics known, based on the calculated weighting coefficient concerning base vector for the each wavelength area.

According to a fourth aspect of the present invention, there is provided a computer readable medium for recording a signal processing program, causing a computer to execute:

performing an acquisition of an image signal composed of a plurality of color signals obtained by a color imaging system provided for subjects including a subject to be an identification object with spectral characteristics known;

separating the acquired image signal into image signals of a plurality of wavelength areas based on the plurality of color signals; and performing an acquisition of a derivation coefficient indicating correlativity between known spectral characteristics of the subject to be the identification object and image signal of respective wavelength areas for the each wavelength area. Here, the derivation coefficient is calculated based on the known spectral characteristics of the subject to be the identification object, spectral characteristics concerning the color imaging system, and spectral characteristics concerning illumination light used in image acquisition of subjects by the color imaging system.

The signal processing program further causes a computer to execute:

calculating a correlation coefficient between the known spectral characteristics of the subject to be the identification object and image signal of the wavelength area for the each wavelength area, based on the separated image signals of the plurality of wavelength areas and the acquired derivation coefficient; and calculating an output signal as identification result of subject to be identification object with the spectral characteristics known, based on the calculated correlation coefficient for the each wavelength area.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a configuration of an endoscope to which a signal processing system according to a first embodiment of the present invention is applied;

FIG. 2 is a view showing a configuration of a filter provided with six kinds of color filters;

FIG. 3 is a view showing spectral characteristics of each color filter of FIG. 2;

FIG. 4 is a view showing one example of a configuration of a calculation unit;

FIG. 8 is a view showing spectral characteristics of respective color filters of differently configured filter provided with six kinds of color filters in a modified example 1 of the first embodiment;

FIG. 9 is a view showing a configuration of a signal processing system according to a modified example 2 of the first embodiment;

FIG. 13 is a view showing a filter configuration composed of four kinds of color filters;

FIG. 14 is a view showing the spectral characteristics of respective color filters of FIG. 13;

FIG. 15A is a view showing one example of a base vector of the short wavelength area;

FIG. 15B is a view showing one example of a base vector of the long wavelength area;

FIG. 16A is a view showing spectral luminance characteristics of the light source of the short wavelength area;

FIG. 16B is a view showing spectral luminance characteristics of the light source of the long wavelength area;

FIG. 17A is a view showing spectral sensitivity characteristics of a color imaging system of the short wavelength area;

FIG. 17B is a view showing spectral sensitivity characteristics of a color imaging system of the long wavelength area;

FIG. 20 is a view showing a configuration of an endoscope to which a signal processing system according to the modified example 1 of the second embodiment is applied;

FIG. 21A is a view showing a filter configuration provided with four kinds of color filters arranged on a front side of a first CCD;

FIG. 21B is a view showing a filter configuration provided with four kinds of color filters arranged on a front side of a second CCD;

FIG. 22 is a view showing spectral characteristics of respective color filters of FIGS. 21A and 21B;

FIG. 23A is a view showing another configuration of the filter provided with four kinds of color filters arranged on the front side of the first CCD;

FIG. 23B is a view showing another configuration of the filter provided with four kinds of color filters arranged on the front side of the second CCD;

FIG. 24 is a view showing spectral characteristics of respective color filters of FIGS. 23A and 23B;

FIG. 27 is a view showing a configuration of a microscope to which a signal processing system according to a third embodiment of the present invention is applied;

FIG. 30 is a view showing a configuration of the microscope to which a signal processing system according to the modified example 1 of the third embodiment is applied;

DETAILED DESCRIPTION OF THE INVENTION

Figure 5A:
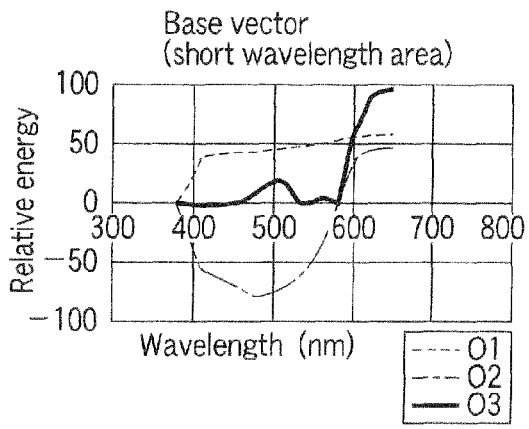
FIG. 5A is a view showing one example of a base vector of short wavelength area.

Hereinafter, the best mode for implementing the present invention will be described referring to the drawings.

First Embodiment

As shown in FIG. 1, an endoscope to which a signal processing system according to a first embodiment of the present invention is applied is provided with an imaging lens system 100, a CCD 101, an illumination lens system 102, an illumination light source 103, an optical fiber 104, an amplification unit (referred to as Gain in the drawing) 105, an analog-to-digital converter (referred to as A/D in the drawing) 106, a buffer 107, an interpolation unit 108, a WB unit 109, a photometric evaluation unit 110, a separation unit 111, a signal processing unit 112, a calculation unit 113, a base vector ROM 114, a system spectral characteristics ROM 115, a normalization unit 116, a falsely-colored processing unit 117, a first output unit 118, a second output unit 119, a control unit 120 and an external interface unit 121. Meanwhile, in the drawings, thick solid arrows indicate a direction of the image signal, thin solid arrows indicate a direction of the control signal, and dotted line arrows indicate the direction of another signals (in the different drawings, respective arrows indicate respective signals in the same way as above).

A color imaging system including the imaging lens system 100, the CCD 101 and the illumination lens system 102 is arranged on a distal end portion of the endoscope inserted into a body of a patient. The illumination light source 103, for example, is disposed at the rear end side of the endoscope, the illumination light from the illumination light source 103 is led to the distal end portion of the endoscope via the optical fiber 104, and the illumination light is emitted to the subject (not illustrated) via the illumination lens system 102. The CCD 101 acquires an image of the subject illuminated in such a way as above, and the image signal obtained by this image acquisition is converted into a digital signal by the analog-to-digital converter 106, after being amplified by the amplification unit 105.

The digital image signal from the analog-to-digital converter 106 is transferred to the interpolation unit 108 via the buffer 107. Additionally, the buffer 107 is also connected to the WB unit 109 and the photometric evaluation unit 110. The WB unit 109 is connected to the amplification unit 105, and the photometric evaluation unit 110 is connected to the illumination light source 103 and the amplification unit 105. The interpolation unit 108 is connected to the separation unit 111. The separation unit 111 is connected to the signal processing unit 112 and the calculation unit 113.

The base vector ROM 114 and the system spectral characteristic ROM 115 are connected to the calculation unit 113. The calculation unit 113 is connected to the first output unit 118 such as a liquid crystal display via the normalization unit 116 and the falsely-colored processing unit 117.

Additionally, the signal processing unit 112 is connected to the second output unit 119 such as a liquid crystal display.

The control unit 120 such as a microcomputer is connected bi-directionally to the amplification unit 105, analog-to-digital converter 106, interpolation unit 108, WB unit 109, photometric evaluation unit 110, separation unit 111, signal processing unit 112, calculation unit 113, normalization unit 116, falsely-colored processing unit 117, first output unit 118, and second output unit 119. Additionally, the external interface unit 121 provided with a power supply switch, a shutter button and an interface to perform setting of switching of respective kinds of modes in image acquisition is also bi-directionally connected to the control unit 120.

Referring to FIG. 1, flow of the signals will be described.

After an image acquisition condition, such as a subject to be an identification object, the color imaging system, the illumination light, and the like which are described later, have been set via the external interface unit 121, the endoscope is entered an image acquisition mode by pressing the shutter button.

In this image acquisition mode, the image signal obtained by the image acquisition with the CCD 101 is output from the CCD 101 continuously in a predetermined time interval as the analog signal. Hereinafter, a plurality of image signals output continuously will be expressed as only image signal, while an image signal corresponding to one sheet of an image will be expressed as a frame signal. Additionally, in the present embodiment, 1/30 second (hereinafter, expressed as one frame time) is assumed as the predetermined time interval.

Furthermore, as the CCD 101, a single CCD is assumed in which a filter 122 with six kinds of color filters as shown in FIG. 2 is disposed on its front side. The filter 122 using 2×3 pixels as a basic unit, is constituted such that six kinds of color filters of blue system (B1, B2), green system (G1, G2), and red system (R1, R2) are arranged for the six pixels of the basic unit. The spectral characteristics of those six kinds of color filters are shown in FIG. 3. In the present embodiment, B1, G1 and R1 are used when generating the ordinary color image signal described later, while assuming sensitivity characteristics of the broad band equivalent to the ordinary color filters of blue, green and red used for the Bayer type CCD, for example. On the other hand, B2, G2 and R2 are used together with B1, G1 and R1 for the signal processing with use of base vectors described later, and have narrow band characteristics compared with B1, G1 and R1. The analog signal from the CCD 101 results in the image signal composed of six kinds of color signals by using such filter 122. That is, in the present embodiment, the plurality of color signals are generated by an image acquisition element composed of the CCD 101 and filter 122 in the color imaging system.

The analog signal from the CCD 101 is amplified by a predetermined amount in the amplification unit 105, is converted into the digital signal by the analog-to-digital converter 106, and is transferred to the buffer 107. The buffer 107 being capable of recording one frame signal, overwrites the frame signal sequentially starting from old frame signal, as the image acquisition proceeds. The frame signal in the buffer 107 is transferred to the WB unit 109 and the photometric evaluation unit 110 intermittently with the predetermined time intervals based on control of the control unit 120.

The WB unit 109 calculates white balance coefficients by accumulating signals of a predetermined level such as a middle level for each color signal corresponding to the color filter of the filter 122. Then, the WB unit 109 transfers the calculated white balance coefficients to the amplification unit 105. The amplification unit 105 performs white balance adjustment by multiplying the white balance coefficient being different for the each color signal by amplification factor. Additionally, the photometric evaluation unit 110 controls light amount of the illumination light source 103, the amplification factor of the amplification unit 105 so as to become proper exposure.

On the other hand, the interpolation unit 108 reads the frame signal from the buffer 107 based on the control of the control unit 120, and generates the frame signal composed of six kinds of color signals by the known interpolation processing. The generated frame signals are transferred to the separation unit 111 in each frame signal unit sequentially. Subsequent processing of the separation unit 111, the signal processing unit 112, the calculation unit 113, the normalization unit 116, and the falsely-colored processing unit 117 are performed synchronously in each one frame signal unit based on the control of the control unit 120.

The separation unit 111 separates the frame signal composed of the color signals for generating the ordinary color image signal from the frame signal composed of plural kinds (six kinds) of color signals transferred from the interpolation unit 108 based on the control of the control unit 120. Further, the separation unit 111 selects to separate the frame signals composed of the color signals corresponding to the plurality of wavelength areas used for the signal processing with base vectors described later used, from the frame signal transferred from the interpolation unit 108. For example, in the case of the frame signal composed of six kinds of color signals corresponding to the filter 122 shown in FIG. 2, the frame signal composed of B1, G1 and R1 as the color signals for generating the ordinary color image signal is separated by the separation unit 111, and then is transferred to the signal processing unit 112. Additionally, as the frame signals in the plurality of wavelength areas used for the signal processing with the base vector used, in the present embodiment, two signals of the frame signal in the short wavelength area and the frame signal in the long wavelength area are assumed. Consequently, by the separation unit 111, the color signals of B1, B2 and G1 as the frame signal in the short wavelength area and the color signals of G2, R1 and R2 as the frame signal in the long wavelength area are independently separated respectively to be transferred to the calculation unit 113. Thus, in the case where those plurality of color signals are disposed in the wavelength direction based on the dominant wavelength in the spectral characteristics of the above plurality of color signals B1, B2, G1, G2, R1 and R2, the separation unit 111 separates the frame signals in the plurality of wavelength areas used for the signal processing with the base vector used from the frame signal composed of the plural kinds of color signals transferred from the interpolation unit 108, such that the image signals of the respective wavelength areas are constituted from the continuous color signals in the wavelength direction.

The signal processing unit 112 calculates the ordinary color image signal by performing the known gradation processing and the enhancement processing to the frame signal composed of three color signals of B1, G1 and R1 transferred from the separation unit 111, based on the control of the control unit 120. Then, the signal processing unit 112 transfers the calculated ordinary color image signal to the second output unit 119. The second output unit 119 indicates the ordinary color image signal as the second output signal.

On the other hand, the base vector ROM 114 stores the base vectors based on known spectral characteristics of the respective plurality of subjects to be identification objects. Additionally, the system spectral characteristics ROM 115 stores the spectral characteristics concerning the respective plurality of color imaging systems, and the spectral characteristics concerning the respective plurality of illumination light used in the image acquisition. Meanwhile, in the present embodiment, the spectral characteristics concerning the color imaging system means the spectral sensitivity characteristics of the CCD 101 with spectral transmittance characteristics of the imaging lens system 100 added. Additionally, the spectral characteristics concerning the illumination light means spectral luminance characteristics of the illumination light source 103 with the spectral transmittance characteristics of the optical fiber 104 for transfer and the illumination lens system 102 added.

The calculation unit 113 reads the base vector from the base vector ROM 114 and the spectral characteristics from the system characteristics ROM 115 respectively based on the control of the control unit 120 in accordance with the image acquisition condition set via the external interface unit 121. That is, from the base vector ROM 114, the calculation unit 113 reads the base vector based on the known spectral characteristics of one subject to be the identification object, and the base vector based on the spectral characteristics of the subject other than one subject to be the identification object. Additionally, the calculation unit 113 reads, from the above system spectral characteristics ROM 115, the spectral characteristics of the image acquisition system including the spectral characteristics concerning one color imaging system provided for the image acquisition of the subject including the subject to be the one identification object, and the spectral characteristics concerning one illumination light used in the image acquisition of the subject by its color imaging system. Thus, the external interface unit 121, for example, functions as an identification object selection unit which selects one subject from among the plurality of subjects to be the identification objects, and a color imaging system selection unit which selects one color imaging system and one illumination light from among the plurality of color imaging systems and the plurality of illumination light. Thereafter, the calculation unit 113 calculates weighting coefficients concerning the base vector for the frame signal of the short wavelength area composed of three color signals of B1, B2 and G1, and the frame signal of long wavelength area composed of three color signals of G2, R1 and R2, transferred from the separation unit 111, while using the read base vectors, the spectral characteristics concerning the color imaging system, and the spectral characteristics concerning the illumination light. The weighting coefficient is calculated independently for the short wavelength area and for the long wavelength area each. These calculated weighting coefficients of the base vector take values being proportional to existence of the subject to be the identification object as described later, and transferred to the output signal calculation unit composed of the normalization unit 116, the falsely-colored processing unit 117 and the first output unit 118.

The normalization unit 116 performs normalization processing such that the weighting coefficient transferred from the calculation unit 113 is congruent with the signal level of the image signal based on the control of the control unit 120. That is, since the weighting coefficients calculated in the calculation unit 113 take values of "0" to "1", the values are normalized to the values of "0" to "255" if the signal level is eight bits, for example. Then, the weighting coefficients after normalization processing are transferred to the falsely-colored processing unit 117.

The falsely-colored processing unit 117, concerning the weighting coefficients in the short wavelength area and the long wavelength area normalized by the normalization unit 116, generates false color signals by assigning the respective different colors. In the present embodiment, for example, red is assigned to the weighting coefficient in the short wavelength area, and cyan is assigned to the weighting coefficient in the long wavelength area. The falsely-colored processing unit 117 transfers the false color signals generated in such a way as above to the first output unit 118.

Accordingly, in the first output unit 118, the independent false color signal for the each wavelength area is indicated for the each wavelength area concerning the subject to be the identification object. That is, the first output unit 118 indicates the output signal obtained by synthesizing the weighting coefficient of the falsely-colored short wavelength area and the weighting coefficient of the falsely-colored long wavelength area. Consequently, the indication is performed by red when the identification object exists in only the short wavelength area, the indication is performed by cyan when the identification object exists in only the long wavelength area, the indication is performed by white=red+cyan when the identification objects exist in both the short wavelength area and the long wavelength area, and the indication is performed by black when the identification object exists in neither short wavelength area nor long wavelength area. Thus, the output signal as identification result of the subject to be the identification object is output. Meanwhile, the short wavelength area means information concerning a surface layer of the object and the long wavelength area means information concerning a deep layer of the object.

Meanwhile, the first output unit 118 and the second output unit 119 are not limited to the display device such as the liquid crystal display, also configuration to store and record sequentially the frame signal into the recording medium such as a hard disk or a memory card is possible.

The calculation unit 113, as shown in FIG. 4, is composed of a data selection unit 201, an accumulation unit 202, a buffer 203, an inverse matrix calculation unit 204, a buffer 205, a coefficient selection unit 206, and a multiplication/addition unit 207. The base vector ROM 114 and the system spectral characteristics ROM 115 are connected to the data selection unit 201. The data selection unit 201 is connected to the coefficient selection unit 206 via the accumulation unit 202, the buffer 203, the inverse matrix calculation unit 204 and the buffer 205. The coefficient selection unit 206 and the separation unit 111 are connected to the multiplication/addition unit 207. The multiplication/addition unit 207 is connected to the normalization unit 116. The control unit 120 is connected bi-directionally to the data selection unit 201, the accumulation unit 202, the inverse matrix calculation unit 204, the coefficient selection unit 206 and the multiplication/addition unit 207.

The data selection unit 201 receives, from the control unit 120, the information of the subject to be the identification object in the image acquisition condition set via the external interface unit 121. Then, the data selection unit 201, based on the information, reads the base vector based on the known spectral characteristics of the subject to be the identification object, and the base vector based on the spectral characteristics of the subject other than the identification object, from the base vector ROM 114. Thus, the base vector ROM 114 and the data selection unit 201, for example, function as a base vector acquisition unit which performs an acquisition of the dedicated base vector based on the known spectral characteristics of the subject to be the identification object.

In the base vector ROM 114, as the base vectors of the subjects to be the identification objects, for example, a blood vessel portion becoming important in diagnosis with the endoscope, the base vector based on the spectral reflection coefficient characteristics of oxyhemoglobin much contained in the artery, and the base vector based on the spectral reflection coefficient characteristics of deoxyhemoglobin much contained in the vein are stored beforehand. Further, the base vector ROM 114 also stores the base vector based on the spectral luminance characteristics of auto-fluorescence of collagen becoming the main subject in the fluorescent observation. Then, for example, when the subject to be the identification object is the artery, the data selection unit 201 reads the base vector based on the spectral reflection coefficient characteristics of oxyhemoglobin from the base vector ROM 114. Additionally, the base vectors of the subjects other than the identification objects are further stored previously into the base vector ROM 114 by selecting the plurality of higher base vectors with high contribution while performing principal component analysis of the spectral reflection coefficient characteristics of Munsell color indicator and the like. In the present embodiment, the single CCD in which the filter 122 composed of six kinds of color filters is disposed on the front side is assumed as the CCD 101, the six kinds of colors are assigned to the short wavelength area and the long wavelength area with the respective three kinds of colors. For this reason, the total number of the base vectors becomes three, the data selection unit 201 reads upper two base vectors with high contribution as the base vectors based on the spectral characteristics of the objects other than the identification object from the base vector ROM 114.

Figure 5B:
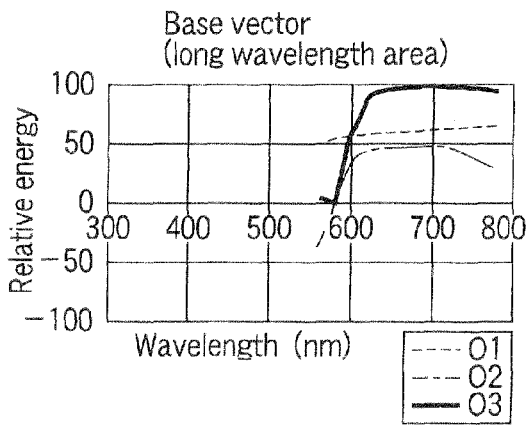
FIG. 5B is a view showing one example of the base vector of long wavelength area.

As one example of the base vectors of the short wavelength area, two base vectors ($O1(\lambda_s)$, $O2(\lambda_s)$) of the subjects other than the identification object, and one base vector ($O3(\lambda_s)$) of the subject to be the identification object are shown in FIG. 5A. Here $\lambda_s$ means a wavelength of the short wavelength area, and in the present embodiment, as the short wavelength area, $\lambda_s$=380 nm to 650 nm is assumed. Additionally, as one example of the base vectors of the long wavelength area, two base vectors ($O1(\lambda_l)$, $O2(\lambda_l)$) of the subjects other than the identification object, and one base vector ($O3(\lambda_l)$) of the subject to be the identification object are shown in FIG. 5B. Here $\lambda_l$ means a wavelength of the long wavelength area, and in the present embodiment, as the long wavelength area, $\lambda_l$=550 nm to 780 nm is assumed.

After that, the data selection unit 201 further receives information of the color imaging system and the illumination light in the image acquisition condition set via the external interface unit 121 from the control unit 120. Then, the data selection section 201 reads the spectral characteristics of the image acquisition system including the spectral characteristics concerning the color imaging system provided for the image acquisition of the subject and the spectral characteristics concerning the illumination light used in the image acquisition of the subject by the color imaging system, from the system spectral characteristics ROM 115 based on the information. Thus, the system spectral characteristics ROM 115 and the data selection unit 201, for example, function as a system spectral characteristics acquisition unit which performs an acquisition of the spectral characteristics of the image acquisition system.

Figure 6A:
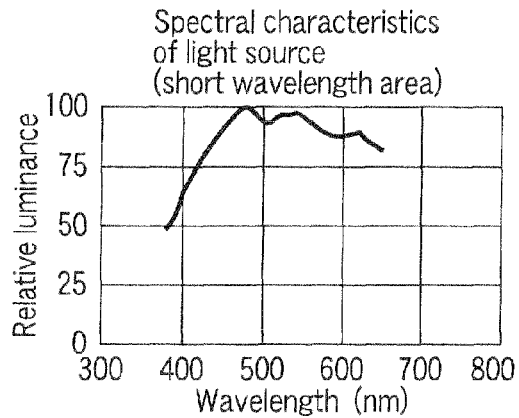
FIG. 6A is a view showing spectral luminance characteristics of a light source in the short wavelength area.
Figure 6B:
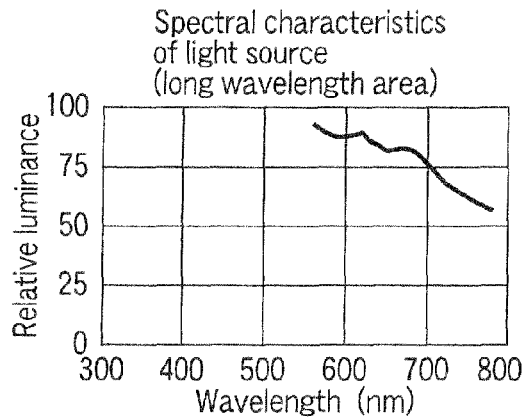
FIG. 6B is a view showing spectral luminance characteristics of the light source in the long wavelength area.
Figure 7A:
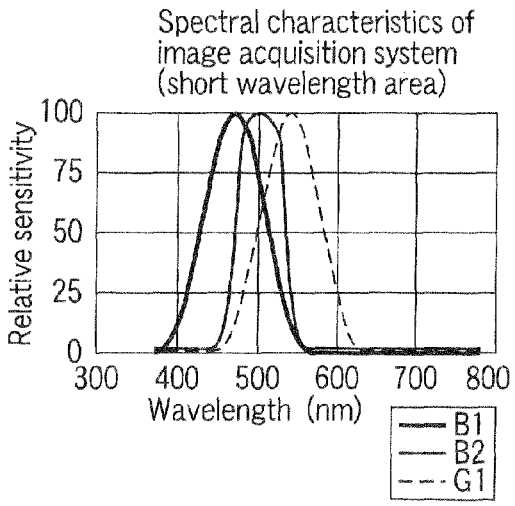
FIG. 7A is a view showing spectral sensitivity characteristics of a color imaging system of the short wavelength area.
Figure 7B:
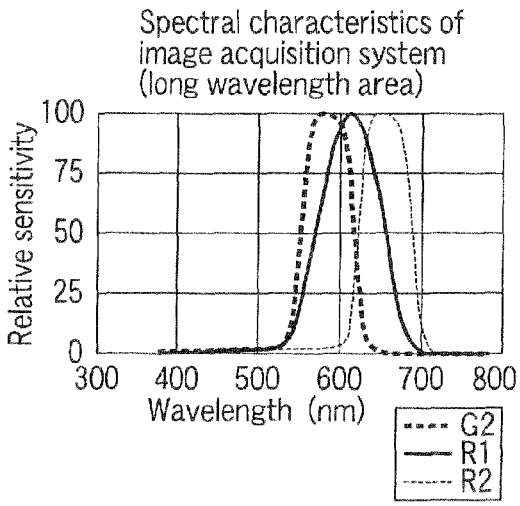
FIG. 7B is a view showing spectral sensitivity characteristics of a color imaging system of the long wavelength area.

As the spectral characteristics concerning the illumination light used in the image acquisition of the subject, spectral luminance characteristic ($I(\lambda_s)$) of the light source of the short wavelength area is shown in FIG. 6A, and similarly, spectral luminance characteristic ($I(\lambda_l)$) of the light source of the long wavelength is shown in FIG. 6B. Here, as one example, the spectral luminance characteristic of a xenon light source is shown. Additionally, as the spectral characteristics concerning the color imaging system, spectral sensitivity characteristics ($SB1(\lambda_s)$, $SB2(\lambda_s)$, $SG1(\lambda_s)$) of the color imaging system of the short wavelength area composed of three color filters of B1, B2 and G1 are shown in FIG. 7A. Similarly, spectral sensitivity characteristics ($SG2(\lambda_l)$, $SR1(\lambda_l)$, $SR2(\lambda_s)$) of the color imaging system of the long wavelength area composed of three color filters of G2, R1 and R2 are shown in FIG. 7B.

The data selection unit 201 transfers the read base vectors ($O1(\lambda_s)$, $O2(\lambda_s)$, $O3(\lambda_s)$), ($O1(\lambda_l)$, $O2(\lambda_l)$, $O3(\lambda_l)$), spectral luminance characteristics ($I(\lambda_s)$), ($I(\lambda_l)$) of the light source and spectral sensitivity characteristics ($SB1(\lambda_s)$, $SB2(\lambda_s)$, $SG1(\lambda_s)$), ($SG2(\lambda_l)$, $SR1(\lambda_l)$, $R2(\lambda_l)$) of the color imaging system to the accumulation unit 202.

The accumulation unit 202, for example, functioning as a matrix calculation unit, calculates a system matrix concerning the image acquisition system with 3×3 size for the respective short wavelength area and long wavelength area independently based on the control of the control unit 120. That is, the accumulation unit 202 calculates a system matrix $M_s$ of the short wavelength area as indicated in following formula (1) and a system matrix $M_l$ of the long wavelength area as indicated in following formula (2):

$$M_s = \begin{bmatrix} \sum_{\lambda_s=380,650} I(\lambda_s) \cdot SB1(\lambda_s) \cdot O1(\lambda_s) & \sum_{\lambda_s=380,650} I(\lambda_s) \cdot SB1(\lambda_s) \cdot O2(\lambda_s) & \sum_{\lambda_s=380,650} I(\lambda_s) \cdot SB1(\lambda_s) \cdot O3(\lambda_s) \\ \sum_{\lambda_s=380,650} I(\lambda_s) \cdot SB2(\lambda_s) \cdot O1(\lambda_s) & \sum_{\lambda_s=380,650} I(\lambda_s) \cdot SB2(\lambda_s) \cdot O2(\lambda_s) & \sum_{\lambda_s=380,650} I(\lambda_s) \cdot B2(\lambda_s) \cdot O3(\lambda_s) \\ \sum_{\lambda_s=380,650} I(\lambda_s) \cdot SG1(\lambda_s) \cdot O1(\lambda_s) & \sum_{\lambda_s=380,650} I(\lambda_s) \cdot SG1(\lambda_s) \cdot O2(\lambda_s) & \sum_{\lambda_s=380,650} I(\lambda_s) \cdot SG1(\lambda_s) \cdot O3(\lambda_s) \end{bmatrix} \quad (1)$$

$$M_s = \begin{bmatrix} \sum_{\lambda_1=550,780} I(\lambda_1) \cdot SG2(\lambda_1) \cdot O1(\lambda_1) & \sum_{\lambda_1=550,780} I(\lambda_1) \cdot SG2(\lambda_1) \cdot O2(\lambda_1) & \sum_{\lambda_1=550,780} I(\lambda_1) \cdot SG2(\lambda_1) \cdot O3(\lambda_1) \\ \sum_{\lambda_1=550,780} I(\lambda_1) \cdot SR1(\lambda_1) \cdot O1(\lambda_1) & \sum_{\lambda_1=550,780} I(1_s) \cdot SR1(\lambda_1) \cdot O2(\lambda_1) & \sum_{\lambda_1=550,780} I(\lambda_1) \cdot SR1(\lambda_1) \cdot O3(\lambda_1) \\ \sum_{\lambda_1=550,780} I(\lambda_1) \cdot SR2(\lambda_1) \cdot O1(\lambda_1) & \sum_{\lambda_1=550,780} I(\lambda_1) \cdot SR2(\lambda_1) \cdot O2(\lambda_1) & \sum_{\lambda_1=550,780} I(\lambda_1) \cdot SR2(\lambda_1) \cdot O3(\lambda_1) \end{bmatrix} \quad (2)$$

The system matrices $M_s$ and $M_l$ calculated by the accumulation unit 202 are transferred to the buffer 203 to be stored therein. The inverse matrix calculation unit 204 reads the system matrices $M_s$ and $M_l$ from the buffer 203 and calculates inverse matrices $M_s^{-1}$ and $M_l^{-1}$ of the system matrices $M_s$ and $M_l$ based on the control of the control unit 120. The calculated inverse matrices $M_s^{-1}$ and $M_l^{-1}$ are transferred to the buffer 205 to be stored therein.

By using the inverse matrices $M_s^{-1}$ and $M_l^{-1}$ of the system matrices, and the frame signal composed of B1, B2, G1 and the frame signal composed of G2, R1, R2, it is possible to determine weighting coefficients ($w1_{sij}$, $w2_{sij}$, $w3_{sij}$) and ($w1_{lij}$, $w2_{lij}$, $w3_{lij}$) concerning the base vectors ($O1(\lambda_s)$, $O2(\lambda_s)$, $O3(\lambda_s)$) and ($O1(\lambda_l)$, $O2(\lambda_l)$, $O3(\lambda_l)$) with each pixel unit used based on the following formula (3) and formula (4). Meanwhile, in the following formula (3) and formula (4), i and j means coordinates in the x, y direction of the frame signal, $m_s$ and $m_l$ means respective elements of the inverse matrices $M_s^{-1}$ and $M_l^{-1}$ of the system matrix, that is, coefficients of the inverse matrices $M_s^{-1}$ and $M_l^{-1}$.

$$\begin{bmatrix} w1_{sij} \\ w2_{sij} \\ w3_{sij} \end{bmatrix} = M_s^{-1} \begin{bmatrix} B1_{ij} \\ B2_{ij} \\ G1_{ij} \end{bmatrix} = \begin{bmatrix} m_{s11} & m_{s12} & m_{s13} \\ m_{s21} & m_{s22} & m_{s23} \\ m_{s31} & m_{s32} & m_{s33} \end{bmatrix} \begin{bmatrix} B1_{ij} \\ B2_{ij} \\ G1_{ij} \end{bmatrix} \quad (3)$$

$$\begin{bmatrix} w1_{lij} \\ w2_{lij} \\ w3_{lij} \end{bmatrix} = M_l^{-1} \begin{bmatrix} G2_{ij} \\ R1_{ij} \\ R2_{ij} \end{bmatrix} = \begin{bmatrix} m_{l11} & m_{l12} & m_{l13} \\ m_{l21} & m_{l22} & m_{l23} \\ m_{l31} & m_{l32} & m_{l33} \end{bmatrix} \begin{bmatrix} G2_{ij} \\ R1_{ij} \\ R2_{ij} \end{bmatrix} \quad (4)$$

In the present embodiment, since oxyhemoglobin much included in blood vessel portion becoming important in the diagnosis with the endoscope is assumed as the identification object, it is suitable that the weighting coefficients ($w3_{sij}$) and ($w3_{lij}$) concerning the base vectors ($O3(\lambda_s)$) and ($O3(\lambda_l)$) may be determined. For this reason, the coefficients of the inverse matrices $M^{-1}$ of the system matrices becoming necessary are six elements of $m_{s31}$, $m_{s32}$, $m_{s33}$ and $m_{l31}$, $m_{l32}$, $m_{l33}$.

Accordingly, the coefficient selection unit 206, based on the control of the control section 120, selects the elements of $m_{s31}$, $m_{s32}$, $m_{s33}$ and $m_{l31}$, $m_{l32}$, $m_{l33}$ of the inverse matrices $M_s^{-1}$ and $M_l^{-1}$ of the system matrices from the buffer 205 to transfer them to the multiplication/addition unit 207. The multiplication/addition unit 207 reads frame signals $B1_{ij}$, $B2_{ij}$, $G1_{ij}$ and $G2_{ij}$, $R1_{ij}$, $R2_{ij}$ with the pixel unit from the separation unit 111 after the elements of $m_{s31}$, $m_{s32}$, $m_{s33}$ and $m_{l31}$, $m_{l32}$, $m_{l33}$ of the inverse matrices $M_s^{-1}$ and $M_l^{-1}$ of the system matrices are transferred from the coefficient selection unit 206, based on the control of the control unit 120. Then, by performing multiplication/addition processing as indicated in the following formula (5) and formula (6), the weighting coefficients ($w3_{sij}$) and ($w3_{lij}$) concerning the base vectors ($O3(\lambda_s)$) and ($O3(\lambda_l)$) of the subject to be the identification object are determined.

$$w3_{sij} = m_{s31} \cdot B1_{ij} + m_{s32} \cdot B2_{ij} + m_{s33} \cdot G1_{ij} \quad (5)$$

$$w3_{lij} = m_{l31} \cdot G2_{ij} + m_{l32} \cdot R1_{ij} + m_{l33} \cdot R2_{ij} \quad (6)$$

Since the weighting coefficients ($w3_{sij}$) and ($w3_{lij}$) become the degree of contribution for the base vectors ($O3(\lambda_s)$) and ($O3(\lambda_l)$) of the subject to be the identification object, in the present embodiment, the weighting coefficients ($w3_{sij}$) and ($w3_{lij}$) take values proportional to existence of the oxyhemoglobin. That is, when the oxyhemoglobin exists, the weighting coefficient takes a high value, while when the oxyhemoglobin does not exist, the weighting coefficient takes a low value. Additionally, the weighting coefficient ($w3_{sij}$) concerning the short wavelength area takes a value proportional to existence of the oxyhemoglobin of the tissue surface layer and the weighting coefficient ($w3_{lij}$) concerning the long wavelength area takes a value proportional to existence of the oxyhemoglobin of the tissue deep layer. Consequently, by image-signalizing the weighting coefficients ($w3_{sij}$) and ($w3_{lij}$), it becomes possible to independently identify the oxyhemoglobin in the surface layer/deep layer, that is, to independently identify the blood vessel of the surface layer and the blood vessel of the deep layer.

Accordingly, the weighting coefficients ($w3_{sij}$) and ($w3_{lij}$) calculated by the multiplication/addition unit 207 are transferred sequentially to the normalization unit 116 and subjected to the normalization processing described above. Then, the weighting coefficients after normalization processing become indicated, for example, on the first output unit 118 being the display monitor, as the output signal being identification result of the subject with the spectral characteristics known.

Meanwhile, in the explanation described above, the identification object is set to the oxyhemoglobin much included in the artery; however, of course, it is not limited thereto. For example, it is suitable to switch the subject to be identification object to the deoxyhemoglobin much included in the vein according to demand, via the external interface unit 121.

As described above, according to the present first embodiment, the weighting coefficient concerning the base vector taking the value proportional to existence of the subject to be the identification object is calculated independently for each wavelength area, from the base vector based on the known spectral characteristics of the subject to be the identification object whose spectral characteristics are known, the spectral characteristics concerning the color imaging system provided for the image acquisition of the subject including the subject to be the identification object, and the spectral characteristics concerning the illumination light used in the image acquisition of the subject by the color imaging system, and the output signal is calculated based on these weighting coefficients. Thus, in the present first embodiment, it is possible to calculate the weighting coefficient taking the value proportional to existence of the subject to be the identification object, by using the base vector based on the known spectral characteristics to be the identification object. Consequently, it is not necessary to perform the signal processing including errors as the conventional approximation by a least squares method. Therefore, since occurrence of the errors caused by the signal processing is small, identification of the subject to be the identification object with high reliability becomes possible.

Additionally, since the ordinary illumination light of the broadband is used, it is possible to suppress influence by the noise, and identification with stability becomes possible.

Further, since the signal processing is performed independently for the each image signal of the specific wavelength area, it becomes possible to obtain information of the required depth in such a manner that, for example, the blood vessel of the surface layer can be identified from the image signal of certain wavelength area, that is, the short wavelength area, and the blood vessel of the deep layer can be identified from the image signal from the another wavelength area, that is, long wavelength area.

Additionally, since selection of the subject to be the identification object is accepted, and in accordance with the selection, the selection of the base vector of the subject to be the identification object is performed from the plurality of base vectors recorded. Therefore, applicability as the system is improved, and utilization in the many applications becomes possible.

Further, since selection of the color imaging system and the illumination light is accepted, and in accordance with the selection, the respective spectral characteristics are selected for use from the plural spectral characteristics concerning the color imaging system and the spectral characteristics concerning the illumination light each recorded previously. Therefore, applicability as the system is improved, and utilization in the many applications becomes possible.

Furthermore, also since the base vectors based on the spectral characteristics other than the identification object is recorded, it becomes possible to apply the signal processing using the base vector to the area other than the identification object according to necessity, and it is possible to improve the degree of freedom in the processing for calculating the output signal at the later stage.

Additionally, since the weighting coefficient concerning the base vector, that is, the identification object is calculated by the signal processing based on the known spectral characteristics of the object to be the identification object and the spectral characteristics of the image acquisition system, occurrence of errors caused by the signal processing is rare, so that the identification with high reliability becomes possible.

Furthermore, since the output signal is determined by normalizing the weighting coefficient concerning the base vector, highly accurate output signal concerning existence of the identification object can be obtained.

Furthermore, since independent color is assigned for each wavelength area, resolution to information of each wavelength area, that is, resolution to information of each depth is improved, so that highly accurate identification becomes possible.

Additionally, since the color image signal ordinary processed is independently calculated, it becomes possible to perform recognition of the whole image signals, and operability for the user is improved.

Furthermore, since the image signals of respective wavelength areas are constituted from the plurality of color signals continuing in the wavelength direction, distinguishing of the base vector and the spectral characteristics of the image acquisition system becomes facilitated when calculating the weighting coefficients concerning the base vector for each wavelength area. Therefore, as compared to the case when constituting the image signal of respective wavelength areas from discrete color signals in the wavelength direction, occurrence of errors caused by the signal processing in the image signals of respective wavelength areas is rare, so that the identification with high reliability becomes possible.

Additionally, since the color signals constituting the image signal are generated by image acquisition elements used for the color imaging system, the plurality of color signals are obtained temporally at the same time, and accordingly, also high accurate identification to a dynamic subject becomes possible.

Furthermore, since four kinds or more of the color signals are used, when the color signals are separated into the image signals of the plurality of wavelength areas, it becomes possible that the image signals of the respective wavelength areas are constituted from the plurality of color signals, occurrence of errors caused by the signal processing in the image signals of respective wavelength areas is rare, so that the identification with high reliability becomes possible.

Meanwhile, although the case for processing a video image is explained, of course, it is possible to perform the same processing to a still image acquired after the still image acquisition in accordance with manipulation of a shutter button (not illustrated) of the external interface unit 121.

Modified Example 1

Although the first embodiment, as shown in FIG. 3, assumes the configuration for setting the band of the color filters of B1, G1, R1 to the broadband for the color filters of B2, G2, R2 while considering a noise-proof property of the ordinary color image signal, it is not limited to such a configuration.

For example, as shown in FIG. 8, a configuration making the whole color filters narrowband is possible. Although, in this case, the noise-proof property of the ordinary color image signal is lowered, it becomes possible to improve accuracy of the signal processing based on the base vector. In the case of FIG. 8, the short wavelength area results in $\lambda_s$=380 nm to 600 nm, the long wavelength area results in $\lambda_l$=600 nm to 780 nm, thus it is possible to eliminate an overlap wavelength in two wavelength areas.

Modified Example 2

Additionally, in the first embodiment, the signal processing system has a configuration integrated with the image acquisition unit composed of the imaging lens system 100, the CCD 101, the illumination lens system 102, the illumination light source 103, the optical fiber 104, the amplification unit 105, the analog-to-digital converter 106, the WB unit 109 and the photometric evaluation unit 110. However it is not limited to such a configuration.

For example, it is possible to perform processing by reading image signal acquired by separate image acquisition unit and stored in the recording medium such as a hard disk and a memory card, with non-processed Raw data form, while recording accompanying information concerning image acquisition condition such as subject to be identification object, color imaging system, and illumination light in the header unit. Alternatively, it is possible to perform processing while receiving the image signal transmitted via a wireless or wired network.

In this case, as shown in FIG. 9, a configuration is constituted in such a way that the imaging lens system 100, the CCD 101, the illumination lens system 102, the illumination light source 103, the optical fiber 104, the amplification unit 105, the analog-to-digital converter 106, the WB unit 109 and the photometric evaluation unit 110 are omitted from the configuration shown in FIG. 1, and an input unit 123 and a header information analysis unit 124 are added. A basic configuration is the same as that shown in FIG. 1, and the same name and reference number are assigned to the same configuration. Hereinafter, only different parts will be described.

The input unit 123 is connected to the buffer 107 and the header information analysis unit 124. The control unit 120 is connected bi-directionally to the input unit 123 and the header information analysis unit 124. When starting reproduction operation via the external interface unit 121 such as a mouse and a keyboard, the signal and header information stored in the recording medium such as the hard disk or memory card, or the signal and header information received via the network are read from the input unit 123. Meanwhile, the image signals are read with a predetermined time interval, in the present modified example, read sequentially by one sheet each with one frame time interval. The signal from the input unit 123 is transferred to the buffer 107, and the header information is transferred to the header information analysis unit 124. The header information analysis unit 124 extracts the information in the image acquisition from the header information to transfer it to the control unit 120. The following processing is the same as that of FIG. 1.

Meanwhile, in the present modified example, of course, it is applicable to either case of the video image and the still image.

Modified Example 3

Further, although, in the above first embodiment, processing with hardware is premised, it is not limited to such a configuration. For example, it is possible to use a configuration in which processing is performed with a software, while inputting image signal and header information to a computer (not illustrated), in which the image signal from the CCD 101 as non-processed Raw data form is output and the image acquisition condition such as the subject to be the identification object, the color imaging system and the illumination light as header information is output from the control unit 120.

Hereinafter, referring to FIG. 10, software processing of the signal processing with the computer (not illustrated) will be described.

The computer operates in accordance with a signal processing program recorded in a computer readable medium (not illustrated). That is, first, the computer inputs the image signal, and the header information concerning the image acquisition condition including the subject to be the identification object, the color imaging system, the illumination light, and the like (step S101). Meanwhile, in the present modified example, it is assumed to process the image signal from the single CCD in which the filter 122 composed of six kinds of color filters shown in FIG. 2 is disposed on the front side thereof.

The computer inputs the plurality of base vectors as shown in FIGS. 5A and 5B following the step S101 (step S102). Additionally, the computer inputs the plurality of spectral luminance characteristics of the light sources shown in FIGS. 6A and 6B, and the plurality of spectral sensitivity characteristics of the color imaging systems shown in FIGS. 7A and 7B (step S103). Here, the plurality of base vectors and the plurality of spectral characteristics of the image acquisition systems are input, by reading out from the recording medium provided for the computer or the detachable recording medium, or by reading via the network.

Then, by the calculation processing whose detail is described later, the predetermined coefficients of the inverse matrices $M_s^{-1}$ and $M_l^{-1}$ of the system matrices used for the weighting coefficient calculation concerning the base vector, that is, the elements $m_{s31}$, $m_{s32}$, $m_{s33}$ and $m_{l31}$, $m_{l32}$, $m_{l33}$ are calculated (step S104). Thereafter, the frame signals are extracted sequentially from the input image signal (step S105) and subsequently, omission color signal is generated by the known interpolation processing (step S106). Then, the frame signals composed of the color signals belonging to two wavelength areas of the short wavelength area and the long wavelength area, and the frame signal composed of the color signals for generating the ordinary color image signal, as shown in FIG. 3, are separated from the interpolated frame signal (step S107). Then, the ordinary color image signal is generated by performing the signal processing such as known gradation processing or enhancement processing for the frame signal composed of the color signals for generating the ordinary color image signal (step S108).

Additionally, one wavelength area is selected in parallel with the signal processing of the step S108 (step S109), and the weighting coefficient concerning the base vector for the frame signal composed of the color signals belonging to the selected wavelength area is calculated, as indicated in the formula (5) or formula (6) (step S110). For example, the weighting coefficient ($w3_{sij}$) concerning the base vector (O3 ($\lambda_s$)) as shown in the formula (5) is calculated for the frame signal composed of the color signals belonging to the short wavelength area. Then, the calculated weighting coefficient is normalized (step S111), and subsequently, the false color signal is generated by assigning the independent color for each wavelength area concerning the normalized weighting coefficient (step S112). For example, the false color signal is generated by normalizing the weighting coefficient ($w3_{sij}$), before assigning red.

After that, whether the processing concerning the whole wavelength areas has been completed is judged (step S113), returning to the S109 when not completed. Then, next, for example, the long wavelength area is selected (step S109), the weighting coefficient ($w3_{lij}$) concerning the base vector ($O3(\lambda_l)$) as indicated in the formula (6) is calculated for the frame signal composed of the color signals belonging to the long wavelength area (step S110), the calculated weighting coefficient ($w3_{lij}$) is normalized (step S111), and the false color signal is generated by assigning cyan (step S112).

Thus, in cases where it is judged that the processing concerning the whole wavelength areas in step S113 is completed, both the ordinary color image signal and the false color signals concerning existence of the identification object are output to the not illustrated display monitors connected to the computer with the frame signal unit (step S114).

After that, whether the whole frame signals are completed is judged (step S115), and the process returns to the S105 when being not completed, or ends when being completed.

Figure 11:
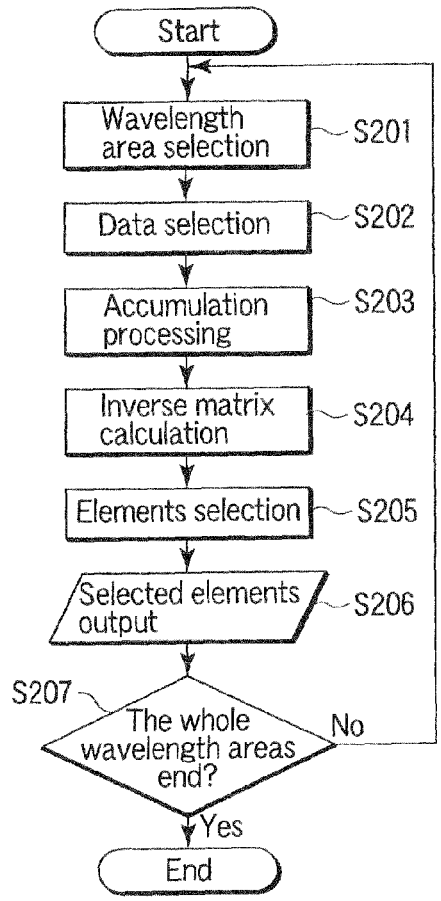
FIG. 11 is a view showing a flowchart concerning calculation processing.

The calculation processing in step S104 is performed as shown in FIG. 11.

First, the computer selects one wavelength area (step S201). After that, the computer selects the data for use from among the plurality of the base vectors input in step S102, the spectral illuminance characteristics of the plurality of light sources input in step S103 and the spectral sensitivity characteristics of the plurality of color imaging systems (step S202). This is the processing in which the base vectors for the wavelength area, the spectral luminance characteristics of light source and the spectral sensitivity characteristics of the color imaging system are selected, based on the image signal and the image acquisition condition including the subject to be the identification object, the color imaging system and the illumination light, in the header information input in step S101. For example, after selecting the short wavelength area, the base vectors ($O1(\lambda_s)$, $O2(\lambda_s)$, $O3(\lambda_s)$) as shown in FIG. 5A, the spectral illuminance characteristics of the light source as shown in FIG. 6A, and the spectral sensitivity characteristics of the color imaging system as shown in FIG. 7A are selected.

After that, the system matrix indicated in the formula (1) or formula (2) is calculated (step S203), and further, the inverse matrix of the system matrix is calculated (step S204). For example, after calculating the system matrix $M_s$ indicated in the formula (1), the inverse matrix $M_s^{-1}$ is calculated. Then, after selecting the elements of the inverse matrix necessary for calculating the weighting coefficient of the base vector is selected as the predetermined coefficient (step S205), and subsequently, the elements of the selected inverse matrix is output (step S206). For example, the elements $m_{s31}$, $m_{s32}$, $m_{s33}$ of the inverse matrix $M_s^{-1}$ necessary for calculating the weighting coefficient ($w3_{sij}$) of the base vector ($O3(\lambda_s)$) are selected to be output.

After that, whether the processing concerning the whole wavelength areas is completed is judged (step S207), returning to step S201 when being not completed. Then, for example, the long wavelength area is selected (step S201), and the base vectors ($O1(\lambda_l)$, $O2(\lambda_l)$, $O3(\lambda_l)$) as shown in FIG. 5B, the spectral illuminance characteristics of the light source as shown in FIG. 6B, and the spectral sensitivity characteristics of the color imaging system as shown in FIG. 7B are selected (step S202). After that, the system matrix $M_l$ indicated in the formula (2) is calculated (step S203), and further, the inverse matrix $M_l^{-1}$ thereof is calculated (step S204). Then, the elements $m_{l31}$, $m_{l32}$, $m_{l33}$ of the inverse matrix $M_l^{-1}$ necessary for calculating the weighting coefficient ($w3_{lij}$) of the base vector ($O3(\lambda_l)$) are selected (step S205), to be output (step S206).

Thus, when it is judged that the processing concerning the whole wavelength areas is completed in step S207, the processing is terminated.

Second Embodiment

Next, the second embodiment of the present invention will be described.

Figure 12:
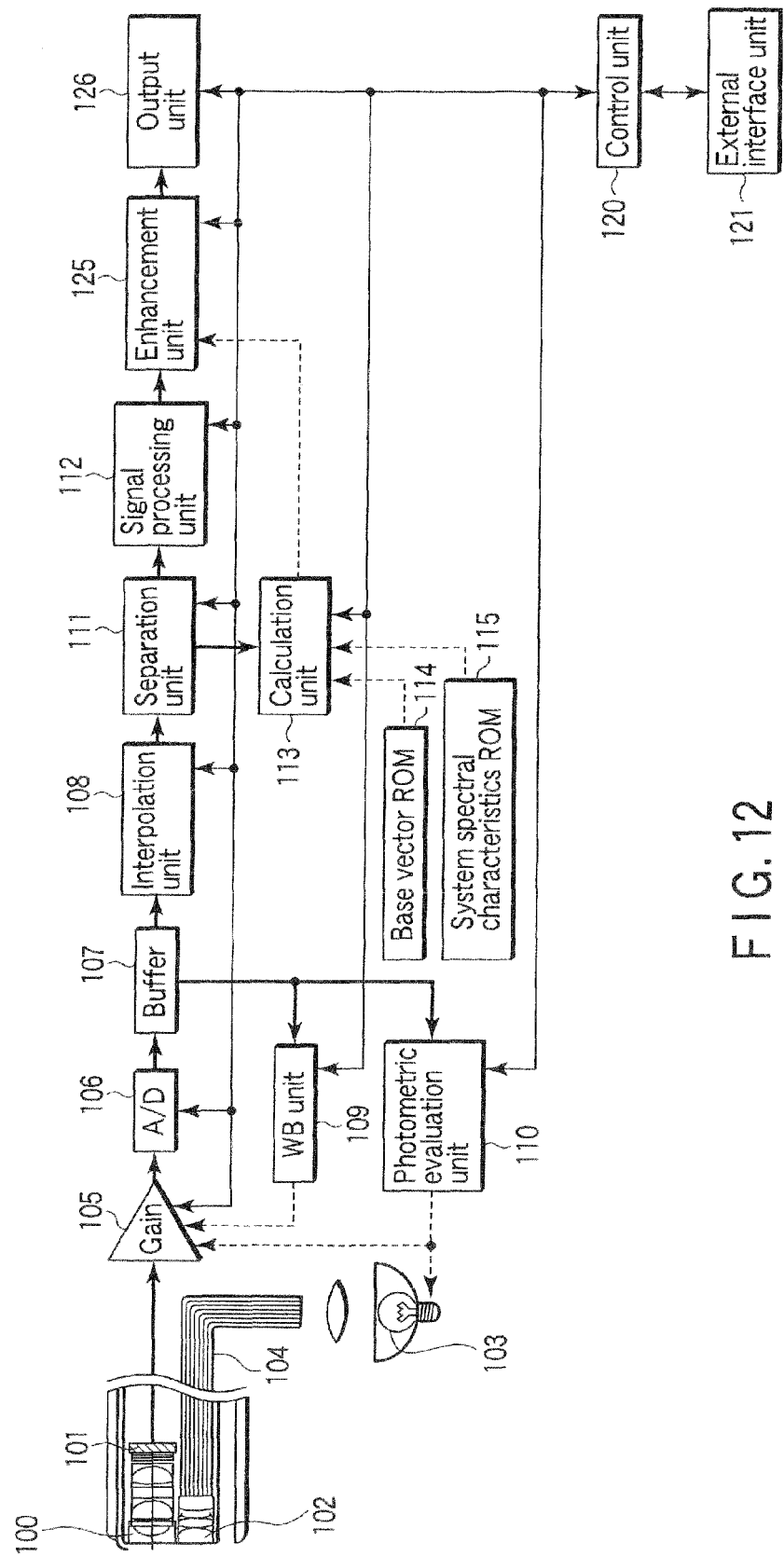
FIG. 12 is a view showing a configuration of the endoscope to which the signal processing system according to the second embodiment of the present invention is applied.

The endoscope to which the signal processing system according to the second embodiment of the present invention is applied, as shown in FIG. 12, has a configuration in which the normalization unit 116, the falsely-colored processing unit 117, the first output unit 118 and the second output unit 119 are eliminated from the configuration of the first embodiment shown in FIG. 1, while an enhancement unit 125 and an output unit 126 are added. The basic configuration is the same as the first embodiment, and accordingly the same name and reference number are added to the same configuration. Hereinafter, only different parts will be explained.

The signal processing unit 112 is connected to the enhancement unit 125. The enhancement unit 125 is connected to the output unit 126 such as a liquid crystal display. The calculation unit 113 is connected to the enhancement unit 125. The control unit 120 is bi-directionally connected to the enhancement unit 125 and the output unit 126.

Also, operations of the signal processing system according to the present embodiment are basically the same as those of the first embodiment, and hereinafter, only different parts will be described.

In FIG. 12, signal flow will be described.

In the present embodiment, as the CCD 101, a single CCD is assumed in which a filter 127 composed of four kinds of color filters shown in FIG. 13 is disposed on a front side thereof. The color filter 127 using 2×2 pixel as a basic unit, is composed of blue (B), green (G), yellow (Ye), red (R) from the short wavelength side. The spectral characteristics of the four kinds of color filters constituting the filter 127 are shown in FIG. 14. By using such the filter 127, analog signal from the CCD 101 results in the image signal composed of four kinds of color signals.

The image signal from the CCD 101 is transferred to the buffer 107 after being converted into the digital signal in the same way as the first embodiment. The interpolation unit 108, based on the control of the control unit 120, reads the frame signal from the buffer 107, and generates the frame signal composed of four kinds of color signals by the known interpolation processing. The frame signals sequentially generated are transferred sequentially to the separation unit 111 with the frame signal unit. The following separation unit 111, signal processing unit 112, calculation unit 113 and enhancement unit 125 perform the processing with one frame signal unit synchronized based on the control of the control unit 120.

The separation unit 111, based on the control of the control unit 120, separates the frame signal composed of the color signals for generating the ordinary color image signal, from the frame signal composed of the plural kinds (four kinds) of the color signals transferred from the interpolation unit 108. Additionally, the separation unit 111 selects to separate the frame signals composed of the color signals corresponding to the plurality of wavelength areas used for the signal processing with the base vectors used. For example, the separation unit 111 separates the frame signal composed of B, G, R as the color signals for generating the ordinary color image signal, from the frame signal composed of four kinds of color signals corresponding to the filter 127 shown in FIG. 13, to transfer the signals to the signal processing unit 112. Additionally, in the present embodiment, two frame signals of the short wavelength area and the long wavelength area are assumed as the frame signals of the plurality of wavelength areas used for the signal processing with the base vectors used. By the separation unit 111, the color signals of B, G as the frame signal of the short wavelength area, and the color signals of Ye, R as the frame signal of the long wavelength area are each separated independently, to be transferred to the calculation unit 113.

The signal processing unit 112, based on the control of the control unit 120, calculates the ordinary color image signal by performing the known gradation processing and enhancement processing for the frame signal composed of three color signals of B, G, R transferred from the separation unit 111. The signal processing unit 112 transfers the ordinary color image signal calculated to the enhancement unit 125.

On the other hand, the calculation unit 113 reads the plurality of base vectors from the base vector ROM 114 based on the control of the control unit 120 in accordance with the image acquisition conditions set via the external interface unit 121. Additionally, the spectral characteristics of the image acquisition system are read from the system spectral characteristics ROM 115. The calculation unit 113, after that, calculates the weighting coefficients concerning the base vector for the frame signal of the short wavelength area constituted of two color signals of B, G transferred from the separation unit 111 and the frame signal of the long wavelength area constituted of two color signals of Ye, R, while using the read base vectors, spectral characteristics concerning the color imaging system, and the spectral characteristics concerning the illumination light. The configuration of the calculation unit 113 is the same as that of the first embodiment shown in FIG. 4. However, in the present embodiment, since the short wavelength area and the long wavelength area are constituted by two kinds of color signals, the total number of the base vectors results in 2.

One example of the base vectors of the short wavelength area includes the base vectors $(O1(\lambda_s), O2(\lambda_s))$ of two identification objects as shown in FIG. 15A. As the short wavelength area of the present embodiment, $\lambda_s=380$ nm to 600 nm is assumed. Additionally, one example of the base vectors of the long wavelength area includes the base vectors $(O1(\lambda_l), O2(\lambda_l))$ of two identification objects as shown in FIG. 15B. As the long wavelength area of the present embodiment, $\lambda_l=500$ nm to 780 nm is assumed. The base vectors of the identification objects, for example, are set from the spectral reflection coefficient characteristics of oxyhemoglobin and deoxyhemoglobin much included in the blood vessel portion becoming important in diagnosis with the endoscope.

Additionally, the spectral characteristics concerning the illumination light used in the image acquisition of the subject, for example, are the spectral illuminance characteristics $(I(\lambda_s))$ of the light source of the short wavelength area as shown in FIG. 16A, and the spectral illuminance characteristics $(I(\lambda_l))$ of the light source of the long wavelength area as shown in FIG. 16B. Further, the spectral characteristics concerning the color imaging system, for example, are the spectral sensitivity characteristics $(SB(\lambda_s), SG(\lambda_s))$ of the color imaging system of the short wavelength area composed of two color filters of B, G as shown in FIG. 17A, and the spectral sensitivity characteristics $(SYe(\lambda_l), SR(\lambda_l))$ of the color imaging system of the long wavelength area composed of two color filters of Ye, R as shown in FIG. 17B.

The calculation unit 113, based on the control of the control unit 120, calculates the system matrix concerning the image acquisition system of 2×2 size for the respective short wavelength area and long wavelength area independently. That is, the calculation unit 113 calculates the system matrix $M_s$ of the short wavelength area as indicated in the following formula (7) and the system matrix $M_l$ of the long wavelength area as indicated in the following formula (8)

$$M_s = \begin{bmatrix} \sum_{\lambda_s=380,600} I(\lambda_s)\cdot SB(\lambda_s)\cdot O1(\lambda_s) & \sum_{\lambda_s=380,600} I(\lambda_s)\cdot SB(\lambda_s)\cdot O2(\lambda_s) \\ \sum_{\lambda_s=380,600} I(\lambda_s)\cdot SG(\lambda_s)\cdot O1(\lambda_s) & \sum_{\lambda_s=380,600} I(\lambda_s)\cdot SG(\lambda_s)\cdot O2(\lambda_s) \end{bmatrix} \quad (7)$$

$$M_l = \begin{bmatrix} \sum_{\lambda_l=500,780} I(\lambda_1)\cdot SYe(\lambda_1)\cdot O1(\lambda_1) & \sum_{\lambda_l=500,780} I(\lambda_1)\cdot SYe(\lambda_1)\cdot O2(\lambda_1) \\ \sum_{\lambda_l=500,780} I(\lambda_1)\cdot SR(\lambda_1)\cdot O1(\lambda_1) & \sum_{\lambda_l=500,780} I(\lambda_1)\cdot SR(\lambda_1)\cdot O2(\lambda_1) \end{bmatrix} \quad (8)$$

The calculation unit 113, after that, calculates the weighting coefficients $(w1_{sij}, w2_{sij})$ and $(w1_{lij}, w2_{lij})$ concerning the base vectors $(O1(\lambda_s), O2(\lambda_s))$ and $(O1(\lambda_l), O2(\lambda_l))$ for the each pixel unit as indicated in the following formula (9) and in the following formula (10) by using the inverse matrices $M_s^{-1}$ and $M_l^{-1}$ of the system matrices, and the frame signal composed of B, G and the frame signal composed of Ye, R.

$$\begin{bmatrix} w1_{sij} \\ w2_{sij} \end{bmatrix} = M_s^{-1} \begin{bmatrix} B_{ij} \\ G_{ij} \end{bmatrix} = \begin{bmatrix} m_{s11} & m_{s12} \\ m_{s21} & m_{s22} \end{bmatrix} \begin{bmatrix} B_{ij} \\ G_{ij} \end{bmatrix} \quad (9)$$

$$\begin{bmatrix} w1_{lij} \\ w2_{lij} \end{bmatrix} = M_l^{-1} \begin{bmatrix} Ye_{ij} \\ R_{ij} \end{bmatrix} = \begin{bmatrix} m_{l11} & m_{l12} \\ m_{l21} & m_{l22} \end{bmatrix} \begin{bmatrix} Ye_{ij} \\ R_{ij} \end{bmatrix} \quad (10)$$

That is, the calculation unit 113 calculates the weighting coefficients $(w1_{sij}, w2_{sij})$ and $(w1_{lij}, w2_{lij})$ concerning the base vectors $(O1(\lambda_s), O2(\lambda_s))$ and $(O1(\lambda_l), O2(\lambda_l))$ based on the following formula (11) to (14):

$$w1_{sij}=m_{s11}\cdot B_{ij}+m_{s12}\cdot G_{ij} \quad (11)$$

$$w2_{sij}=m_{s21}\cdot B_{ij}+m_{s22}\cdot G_{ij} \quad (12)$$

$$w1_{lij}=m_{l11}\cdot Ye_{ij}+m_{l12}\cdot R_{ij} \quad (13)$$

$$w2_{lij}=m_{l21}\cdot Ye_{ij}+m_{l22}\cdot R_{ij} \quad (14)$$

The weighting coefficients $(w1_{sij}, w2_{sij})$ and $(w1_{lij}, w2_{lij})$ of the base vectors thus calculated are transferred to the enhancement unit 125. The enhancement unit 125, based on the control of the control unit 120, reads the ordinary color image signal from the signal processing unit 112, and the weighting coefficients $(w1_{sij}, w2_{sij})$ and $(w1_{lij}, w2_{lij})$ concerning the base vectors from the calculation unit 113. After that, the enhancement unit 125 performs enhancement processing based on the weighting coefficients $(w1_{sij}, w2_{sij})$ and $(w1_{lij}, w2_{lij})$ transferred from the calculation unit 113 for the ordinary color image signal transferred from the signal processing unit 112. As the enhancement processing described above, the known saturation enhancement processing is assumed, and the enhancement processing is executed with a form in which these enhancement amounts are proportional to the weighting coefficient. Additionally, also it is possible to perform the enhancement processing independently for the each wavelength area. The frame signal after enhancement processing is transferred to the output unit 126. Thereby, on the output unit 126, the ordinary color image signal is displayed in which existence area of the identification objects are enhanced for each wavelength area.

Figure 18:
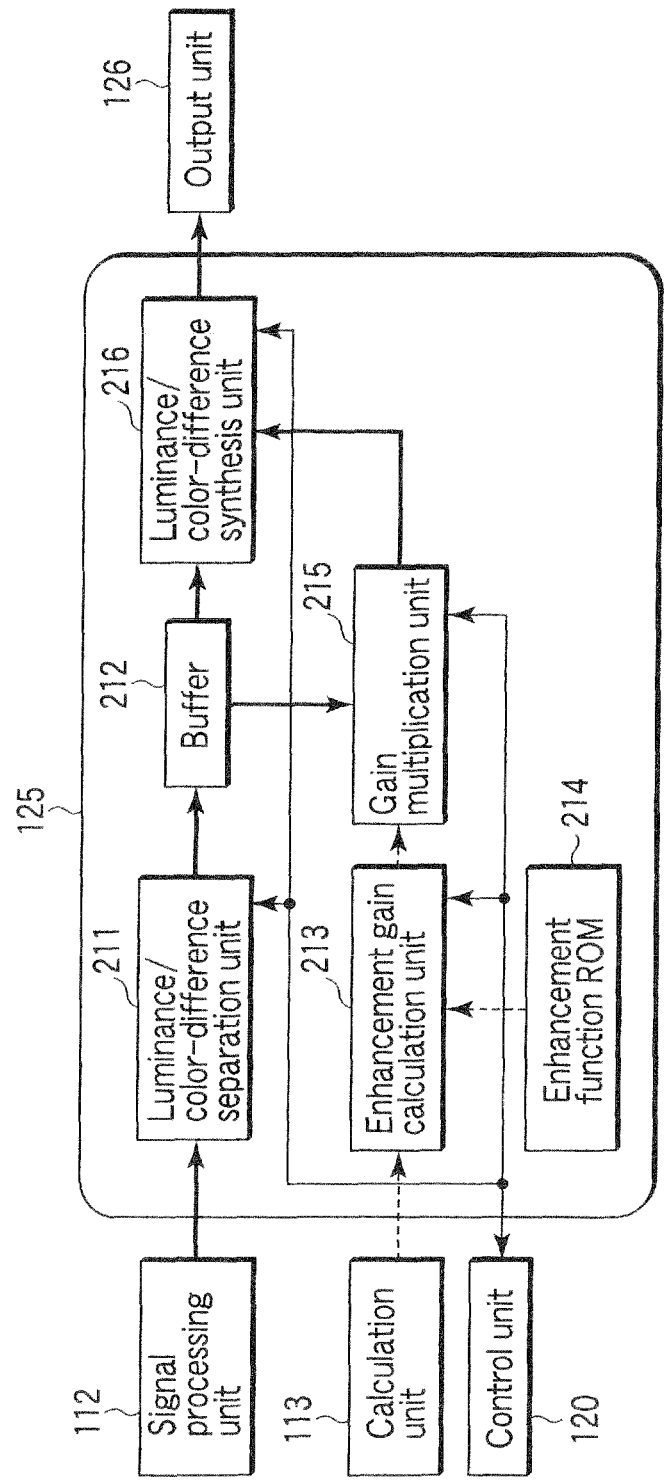
FIG. 18 is a view showing one example of a configuration of an enhancement unit.

The enhancement unit 125, as shown in FIG. 18, is composed of a luminance/color-difference separation unit 211, a buffer 212, an enhancement gain calculation unit 213, an enhancement function ROM 214, a gain multiplication unit 215 and a luminance/color-difference synthesis unit 216. The signal processing unit 112 is connected to the buffer 212 via the luminance/color-difference separation unit 211. The buffer 212 is connected to the gain multiplication unit 215 and the luminance/color-difference synthesis unit 216. The calculation unit 113 and the enhancement function ROM 214 are connected to the enhancement gain calculation unit 213. The enhancement gain calculation unit 213 is connected to the gain multiplication unit 215, and the gain multiplication unit 215 is connected to the luminance/color-difference synthesis unit 216. The luminance/color-difference synthesis unit 216 is connected to the output unit 126. The control unit 120 is connected bi-directionally to the luminance/color-difference separation unit 211, the enhancement gain calculation unit 213, the gain multiplication unit 215 and the luminance/color-difference synthesis unit 216.

The luminance/color-difference separation unit 211, based on the control of the control unit 120, calculates the luminance signal $Y_{ij}$ and color-difference signals $Cb_{ij}$, $Cr_{ij}$ based on the following formula (15), for the ordinary color image signal of $R_{ij}$, $G_{ij}$, $B_{ij}$ transferred from the signal processing unit 112.

$$Y_{ij}=0.29900R_{ij}+0.58700G_{ij}+0.11400B_{ij}$$

$$Cb_{ij}=-0.16874R_{ij}-0.33126G_{ij}+0.50000B_{ij}$$

$$Cr_{ij}=0.50000R_{ij}-0.41869G_{ij}-0.08131B_{ij} \quad (15)$$

These calculated luminance signal and color-difference signals are transferred to the buffer 212 to be recorded therein.

On the other hand, the enhancement gain calculation unit 213, based on the control of the control unit 120, reads the weighting coefficients ($w1_{sij}$, $w2_{sij}$) concerning the base vectors of the short wavelength area and the weighting coefficients ($w1_{lij}$, $w2_{lij}$) concerning the base vectors of the long wavelength area from the calculation unit 113. Additionally, the enhancement gain calculation unit 213 reads a gain table for determining the gain for the enhancement from the enhancement function ROM 214.

Figure 19:
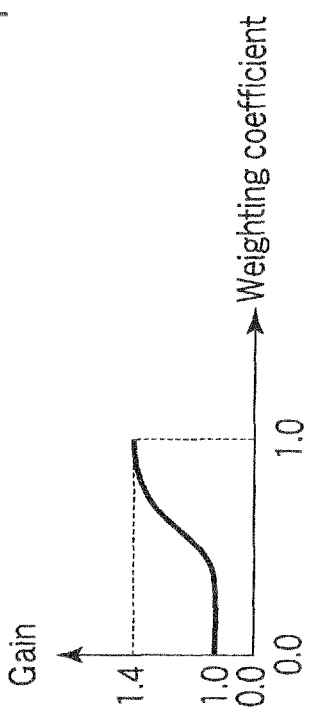
FIG. 19 is a view showing one example of a gain table for enhancement.

The gain table for enhancement recorded in the enhancement function ROM 214, for example, as shown in FIG. 19, is a table for outputting the gain for enhancement with the weighting coefficient concerning the base vector as input. Therefore, the enhancement gain calculation unit 213 calculates the gain for the weighting coefficient concerning the read base vector in accordance with the table. Meanwhile, it is premised that the weighting coefficients concerning the base vector take values of "0" to "1". Further, in the present embodiment, although two weighting coefficients concerning oxyhemoglobin and deoxyhemoglobin are obtained, average value of the both is used for calculation of the gain. The gain is calculated independently with respect to the short wavelength area ($gain_{sij}$) and the long wavelength area ($gain_{lij}$).

The gains $gain_{sij}$, $gain_{lij}$ calculated in the enhancement gain calculation unit 213 are transferred to the gain multiplication unit 215. The gain multiplication unit 215, based on the control of the control unit 120, reads the color-difference signals $Cb_{ij}$, $Cr_{ij}$ from the buffer 212, and reads the gains $gain_{sij}$, $gain_{lij}$ from the enhancement gain calculation unit 213. After that, the enhancement processing indicated in the following formula (16) concerning the color-difference signals $Cb_{ij}$, $Cr_{ij}$ is performed.

$$Cb'_{ij}=gain_{lij} \cdot Cb_{ij}$$

$$Cr'_{ij}=gain_{sij} \cdot Cr_{ij} \quad (16)$$

Here, the enhancement processing indicated in the formula (16) signifies that Cb (bluish color) is enhanced based on the weighting coefficient of the long wavelength area concerning the blood vessel of the deep layer, while Cr (reddish color) is enhanced based on the weighting coefficient of the short wavelength area concerning the blood vessel of the surface layer. For this reason, the identification of the short wavelength area and the long wavelength area becomes possible. The color-difference signals $Cb'_{ij}$, $Cr'_{ij}$ subjected to the enhancement processing are transferred to the luminance/color-difference synthesis unit 216.

The luminance/color-difference synthesis unit 216, based on the control of the control unit 120, reads the luminance signal $Y_{ij}$ from the buffer 212, and reads the color-difference signals $Cb'_{ij}$, $Cr'_{ij}$ subjected to the enhancement processing from the gain multiplication unit 215. Then, the luminance/color-difference synthesis unit 216 calculates the ordinary color image signal subjected to the enhancement processing by performing the enhancement processing indicated in the following formula (17):

$$R'_{ij}=Y_{ij}+1.40200Cr'_{ij}$$

$$C'_{ij}=Y_{ij}-0.34414Cb'_{ij}-0.71414Cr'_{ij}$$

$$B'_{ij}=Y_{ij}+1.77200Cb'_{ij} \quad (17)$$

The ordinary color image signal subjected to the enhancement processing in the luminance/color-difference synthesis unit 216 is transferred to the output unit 126.

Meanwhile, in the example, although the configuration is such that the surface layer is enhanced by reddish color, while the deep layer is enhanced by bluish color, it is not limited to such a configuration. It is possible to enhance arbitrary color upon combining the color difference signals Cb, Cr.

Additionally, although the configuration is such that the average value of the weighting coefficients concerning oxyhemoglobin and deoxyhemoglobin is used because the blood vessel is the identification object, it is not limited to such a configuration. For example, oxyhemoglobin of the surface layer is enhanced by red, deoxyhemoglobin of the surface layer is enhanced by yellow, oxyhemoglobin of the deep layer is enhanced by blue, and deoxyhemoglobin is enhanced by green, thus making it possible to enhance the identification object independently.

According to the present second embodiment, it is possible to bring out the same effect as the first embodiment.

Additionally, in the present second embodiment, since the enhancement processing is performed from the weighting coefficient concerning the base vector, only existence area of the identification object is enhanced, so that it becomes possible to improve recognition ability. Since also the enhancement processing can be performed independently for each wavelength area, separation ability for information of respective wavelength areas, that is, for information of respective depth is improved, so that it becomes possible to perform highly accurate identification. Further, also as to the areas other than the identification object, since the color image signal subjected to the ordinary processing is output, recognition of the whole image signal becomes facilitated, so that operability for the user is improved.

Meanwhile, although the case of processing the video image has been explained, like the first embodiment, it is of course that the same processing can be performed to the still image.

Modified Example 1

In the second embodiment, although the configuration is such that the single CCD is used as the CCD 101, it is not limited to such a configuration. For example, configuration using two CCDs or three CCDs is possible.

For example, as shown in FIG. 20, in the configuration of the second embodiment shown in FIG. 12, a configuration can be achieved in which the single CCD 101 is replaced with the two CCDs including a first CCD 101A and a second CCD 101B. The basic configuration is the same as that in FIG. 12, in which the same name and reference number are assigned to the same configuration. Hereinafter, only different parts will be explained.

A beam from the imaging lens system 100 positioned at the distal end portion of the endoscope is separated into two directions by a prism system 128 to be led to the first CCD 101A and the second CCD 101B. The modified example assumes that the first CCD 101A and the second CCD 101B each have three kinds of color filters. The first CCD 101A, as shown in FIG. 21A, is one in which the filter 129A using 2×2 pixels as a basic unit, in which red (R), yellow (Ye) filters are disposed for each one pixel and green (G) of two pixels are disposed, is arranged on the front side thereof. On the other hand, the second CCD 101B, as shown in FIG. 21B, is one in which the filter 129B using 2×2 pixels as a basic unit, in which blue (B), light blue (LB) filters are disposed for each one pixel and green (G) of two pixels are disposed, is arranged on the front side thereof. Here, the G filter in the first CCD 101A is the same as that in the second CCD 101B, and arrangement in the 2×2 pixels is set exclusively.

The image signals acquired via the first CCD 101A and the second CCD 101B are amplified in the amplification unit 105, converted into the digital signals in the analog-to-digital converter 106, and transferred to the buffer 107. The interpolation unit 108, based on the control of the control unit 120, reads two frame signals from the buffer 107, and generates one frame signal composed of five kinds of color signals by the known interpolation processing. The frame signals sequentially generated are transferred sequentially to the separation unit 111 with the frame signal unit used.

The separation unit 111, based on the control of the control unit 120, separates the frame signal composed of the color signals for generating the ordinary color image signal, from the frame signal transferred from the interpolation unit 108. Additionally, the separation unit 111 selects the frame signals composed of the color signals corresponding to the plurality of wavelength areas used for the signal processing with the base vectors used, from the frame signal from the interpolation unit 108, to separate. For example, the separation unit 111 separates the frame signal composed of B, G, R as the color signals for generating the ordinary color image signal, from the frame signal composed of five kinds of color signals corresponding to the filters 129A, 129B shown in FIG. 22 to transfer the signal to the signal processing unit 112. Additionally, also in the present modified example, as the frame signals of the plurality of wavelength areas used for the signal processing with the base vectors used, two of frame signal of the short wavelength area and the frame signal of the long wavelength area are assumed. The separation unit 111 independently separates the color signals of B, BL, G as the frame signal of the short wavelength area, and the color signals of G, Ye, R as the frame signal of the long wavelength area, to transfer them to the calculation unit 113. Meanwhile, the color signal of G is used in common in the both wavelength areas. The frame signals of the short wavelength area and the frame signals of the long wavelength area are each constituted by three kinds of color signals. For this reason, the total number of the base vectors used, like the first embodiment, becomes three.

Meanwhile, the example has five kinds of color filters used in the two CCDs. This is because it is assumed that the color signal of G used in the case of generating the ordinary color image signal is obtained from the whole pixels. The color signal of G is a main component of the luminance signal, so that it is possible to improve resolution because the color signal of G can be obtained from the whole pixels.

However it is not limited to such a configuration. For example, such as filters 129C, 129D, as shown in FIGS. 23A and 23B, a configuration using eight kinds of color filters composed of F1, F2, F3, F4, F5, F6, F7 and F8 is possible. In this case, as shown in FIG. 24, the frame signal of the short wavelength area is constituted of the color signals of F1, F2, F3 and F4, and the frame signal of the long wavelength area is constituted of the color signals of F5, F6, F7 and F8, and thus, the total number of the base vector used is four. Additionally, as the color signal for generating the ordinary color image signal, F1, F4 and F8 are used. When using such a configuration, although resolution concerning the ordinary color image signal is lowered, it is possible to improve accuracy of the signal processing with the base vectors used.

Modified Example 2

Additionally, in the second embodiment, although processing according to the hardware is premised, it is not limited to such a configuration. For example, a configuration is possible in which the image signals from the CCD 101 are made non-processed Raw data form, and the subject to be the identification object, and the image acquisition condition including the color imaging system, the illumination light or the like are output as the header information from the control unit 120, and subsequently, those image signals and the header information are input to the computer (not illustrated) to be processed with the software.

The software processing of the signal processing by the computer (not illustrated) will be explained while referring to FIG. 25 below. Meanwhile, the same processing step as the flowchart of the signal processing in the modified example 3 of the first embodiment shown in FIG. 10 has the same reference step number as that in FIG. 10.

The computer operates in accordance with a signal processing program recorded in a computer readable medium (not illustrated). That is, the computer first inputs the image signals and the header information concerning the image acquisition condition including the subject to be the identification object, the color imaging system, the illumination light and the like (step S101). Meanwhile, it is assumed that, in the present modified example, the image signal from the single CCD, in which the filter 127 composed of four kinds of color filters is disposed on the front side thereof, shown in FIG. 13 is processed.

The computer inputs the plurality of base vectors as shown in FIGS. 15A and 15B following step S101 (step S102).

Additionally, the computer inputs the plurality of spectral luminance characteristics of the light source shown in FIGS. 16A and 16B, and the plurality of spectral sensitivity characteristics of the color imaging systems shown in FIGS. 17A and 17B (step S103). Here, the plurality of base vectors and the plurality of spectral characteristics of the image acquisition systems are input by reading from the recording medium provided for the computer or the detachable recording medium, and by reading via the network.

Then, like the modified example 3 of the first embodiment, the predetermined coefficients of the inverse matrices $M_s^{-1}$ and $M_l^{-1}$ of the system matrices used in calculation of the weighting coefficients concerning the base vectors, that is, the elements $m_{s11}$, $m_{s12}$, $m_{s21}$, $m_{s22}$, and $m_{l11}$, $m_{l12}$, $m_{l21}$, $m_{l22}$, are calculated (step S104). Thereafter, the frame signals are extracted sequentially from the input image signal (step S105), and subsequently, an omission color signal is generated by the known interpolation processing (step S106). Then, the frame signals composed of the color signals belonging to two wavelength areas of the short wavelength area and the long wavelength area, and the frame signal composed of the color signals for generating the ordinary color image signal, as shown in FIG. 14, are separated from the interpolated frame signal (step S107). Then, the ordinary color image signal is generated by performing the signal processing such as known gradation processing or enhancement processing for the frame signal composed of the color signals for generating the ordinary color image signal (step S108).

Additionally, one wavelength area is selected in parallel with the signal processing of step S108 (step S109), and the weighting coefficients concerning the base vectors are calculated as indicated in the formula (11) and formula (12), or in the formula (13) or formula (14), for the frame signal composed of the color signals belonging to the selected wavelength area (step S110). For example, the weighting coefficients ($w1_{sij}$, $w2_{sij}$) concerning the base vectors ($O1(\lambda_s)$, $O2(\lambda_s)$) as indicated in the formula (11) and formula (12) are calculated, for the frame signal composed of the color signals belonging to the short wavelength area.

After that, whether the processing concerning the whole wavelength areas is completed is judged (step S113), returning to S109 when not being completed. Then, for example, the long wavelength area is selected (step S109), the weighting coefficients ($w1_{lij}$, $w2_{lij}$) concerning the base vectors ($O1(\lambda_l)$, $O2(\lambda_l)$) as indicated in the formula (13) and formula (14) are calculated, for the frame signal composed of the color signals belonging to the long wavelength area (step S110).

Thus, when it has been judged that the processing concerning the whole wavelength areas is completed in step S113, as the detail will be described later, the enhancement processing is performed based on the weighting coefficients ($w1_{sij}$, $w2_{sij}$, $w1_{lij}$, $w2_{lij}$) concerning the base vectors calculated for the ordinary color image signal (step S116). Then, the ordinary color image signal subjected to the enhancement processing is output to the not illustrated display monitor connected to the computer with the frame signal unit used (step S114).

After that, whether the whole frame signals are completed is judged (step S115), returning to the S105 when being not completed, while terminated when being completed.

Figure 26:
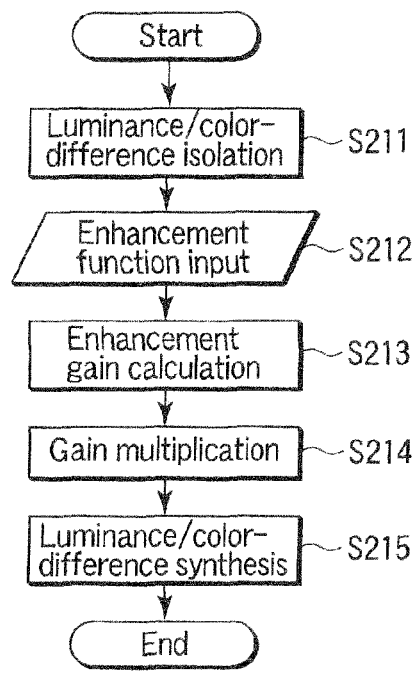
FIG. 26 is a view showing a flowchart concerning calculation processing.

The enhancement processing in step S116 is performed as shown in FIG. 26.

The computer first calculates the luminance signal and the color difference signals as indicated in the formula (15) (step S211). After that, the computer inputs a gain table for determining gain for enhancement shown in FIG. 19 (step S212). Here, the computer inputs the gain table in such a way that the computer reads out the gain table from the recording medium provided for the computer or from the detachable recording medium, or the computer reads the gain table via the network. Then, the computer calculates gains ($gain_{sij}$, $gain_{lij}$) for enhancement for each wavelength area from the weighting coefficients ($w1_{sij}$, $w2_{sij}$, $w1_{lij}$, $w2_{lij}$) concerning the base vectors ($O1(\lambda_j)$, $O2(\lambda_j)$) calculated, while using the input gain table (step S213). After that, as indicated in the formula (16), the computer performs the enhancement processing by multiplying the color difference signals by the calculated gains ($gain_{sij}$, $gain_{lij}$) (step S214). Then, as indicated in the formula (17), the computer calculates the ordinary color image signal subjected to the enhancement processing by synthesizing the luminance signal with the color difference signal subjected to the enhancement processing (step S215).

Third Embodiment

Next, the third embodiment of the present invention will be explained.

A microscope to which the signal processing system according to the third embodiment of the present invention is applied has a configuration in which, as shown in FIG. 27, the interpolation unit 108, the calculation unit 113, the base vector ROM 114 and the system spectral characteristics ROM 115 are eliminated from the configuration of the first embodiment shown in FIG. 1, and a rotation filter 130, a correlation coefficient calculation unit 131 and a derivation coefficient ROM 132 are added thereto. A basic configuration is the same as the first embodiment, and accordingly, the same name and reference number are assigned to the same configuration. Hereinafter, only different parts will be explained.

In the present embodiment, the image signal from the CCD 101 of the microscope is amplified by the amplification unit 105, and subsequently, converted into the digital signal by the analog-to-digital converter 106. Meanwhile, in the present embodiment, a single CCD for black and white is assumed as the CCD 101. In an objective stage of the microscope, after the illumination light from the illumination light source 103 is passed through the plurality of color filters, in the present embodiment, eight kinds of color filters, mounted on the rotation filter 130, the illumination light is derived via the illumination lens system 102. The buffer 107 is connected to the WB unit 109, the photometric evaluation unit 110 and the separation unit 111. The separation unit 111 is connected to the signal processing unit 112 and the correlation coefficient calculation unit 131. The derivation coefficient ROM 132 is connected to the correlation coefficient calculation unit 131. The correlation coefficient calculation unit 131 is connected to the normalization unit 116. The control unit 120 is bi-directionally connected to the rotation filter 130 and the correlation coefficient calculation unit 131.

Also the operation of the signal processing system according to the present embodiment is basically the same as the first embodiment, and accordingly, only different parts will be explained.

In FIG. 27, a flow of the signals will be explained. After setting the image acquisition condition such as the subject to be the identification object described later via the external interface unit 121, a pre-image acquisition mode is started when a shutter button (not illustrated) in the external interface unit 121 is half-depressed. The CCD 101 acquires an image of a subject focused on the CCD 101 via the imaging lens system 100 to output the image signals as the analog signal.

Meanwhile, in the present embodiment, it is assumed that eight kinds of color filters are mounted on the rotation filter 130. One sheet of the image signal is constituted from eight kinds of color signals obtained by eight times image acquisition while generating eight kinds of illumination light with the rotation filter 130 rotated. The spectral characteristics of the eight kinds of color filters composed of F1, F2, F3, F4, F5, F6, F7 and F8 in the rotation filter 130 result in those shown in FIG. 28. Rotation of the rotation filter 130 is performed in synchronization with the image acquisition in the CCD 101 based on the control of the control unit 120. Thus, in the present embodiment, the plurality of color signals are generated by the illumination light used in the image acquisition of the subject by the color imaging system, which illumination light are generated by the illumination light source 103 and the rotation filter 130.

The analog signal is amplified in the amplification unit 105 by a predetermined amount, and converted into the digital signal in the analog-to-digital converter 106, before being transmitted to the buffer 107. The buffer 107 is capable of recording the image signal composed of eight kinds of color signals. The image signal in the buffer 107, based on the control of the control unit 120, is transferred to the WB unit 109 and the photometric evaluation unit 110. Like the first embodiment, the white balance processing is performed in the WB unit 109 and exposure control is performed in the photometric evaluation unit 110 respectively.

Next, main image acquisition is performed by full depression of the shutter button in the external interface unit 121, and the image signal is transferred to the buffer 107 in the same way as the pre-image acquisition. The image signal in the buffer 107 is transferred to the separation unit 111. The separation unit 111, based on the control of the control unit 120, separates the frame signal composed of the color signals for generating the ordinary color image signal from the frame signal composed of eight kinds of color signals recorded in the buffer 107. Additionally, the separation unit 111 selects to separate the frame signals composed of the color signals corresponding to the plurality of wavelength areas used for the signal processing with the base vectors used, from the frame signal composed of the eight kinds of color signals recorded in the buffer 107. For example, the separation unit 111 separates the frame signal composed of F1, F4, F8 as the color signals for generating the ordinary color image signal, from the frame signal composed of eight kinds of color signals corresponding to the color filter of the rotation filter 130 shown in FIG. 28, to transfer it to the signal processing unit 112. Additionally, as the frame signals of the plurality of wavelength areas used for the signal processing with the base vectors used, the present embodiment assumes three of the frame signal of the short wavelength area, the frame signal of a middle wavelength area and the frame signal of the long wavelength area. The separation unit 111 separates independently the color signals of F1, F2 and F3 as the frame signal of the short wavelength area, the color signals of F2, F3, F4, F5 and F6 as the frame signal of the middle wavelength area and the color signals of F6, F7 and F8 as the frame signal of the long wavelength area respectively, to transfer to the correlation coefficient calculation unit 131.

The signal processing unit 112, based on the control of the control unit 120, calculates the ordinary color image signal by performing the known gradation processing and the enhancement processing for the image signal composed of three color signals of F1, F4 and F8 transferred from the separation unit 111. Then, the signal processing unit 112 transfers the ordinary color image signal calculated, to the second output unit 119. Since the spectral characteristics of the color filters F1, F4 and F8 correspond to the ordinary B, G and R signals, the second output unit 119 displays the ordinary color image signal as the second output signal.

On the other hand, the derivation coefficient ROM 132 stores derivation coefficients for deriving correlativity between the spectral characteristics of the subject and the image signal for each subject to be the identification object. The derivation coefficients are calculated preliminarily based on the known spectral characteristics of the subject, the spectral characteristics concerning the color imaging system devoted for the image acquisition of the subject, and the spectral characteristics concerning the illumination light used in the image acquisition of the subject, to be stored.

The correlation coefficient calculation unit 131 reads the derivation coefficients from the derivation coefficient ROM 132 based on the control of the control unit 120 in accordance with selection of the subject to be the identification object in the image acquisition condition set via the external interface unit 121. After that, the correlation coefficient calculation unit 131 calculates the correlation coefficients between the spectral characteristics of the subject to be the identification object and the image signal using the read derivation coefficients, for the image signal of the short wavelength area constituted of three color signals of F1, F2 and F3, the image signal of the middle wavelength area constituted of five color signals of F2, F3, F4, F5 and F6, and the image signal of the long wavelength area constituted of three color signals of F6, F7 and F8 transferred from the separation unit 111. The correlation coefficients calculated by the correlation coefficient calculation unit 131 take a value proportional to existence of the subject to be the identification object, and are transferred to the normalization unit 116, in which normalization processing is performed so that correlation coefficients are congruent with the signal level (for example, if the signal level is eight bits, correlation coefficient takes "0" to "255") of the image signal. The correlation coefficients after normalization processing are transferred to the falsely-colored processing unit 117.

The falsely-colored processing unit 117 generates the false color signal by assigning respective different colors, concerning the correlation coefficients of the short wavelength area, the middle wavelength area and the long wavelength area normalized in the normalization unit 116. In the present embodiment, for example, red is assigned to the correlation coefficient of the short wavelength area, green is assigned to the correlation coefficient of the middle wavelength area, and blue is assigned to the correlation coefficient of the long wavelength area. The falsely-colored processing unit 117 transfers the false color signal thus generated to the first output unit 118, whereby the independent false color signal for each wavelength area concerning the subject to be the identification object is displayed on the first output unit 118. Meanwhile, the short wavelength area signifies the information concerning the surface layer of the object, the middle wavelength area signifies the information concerning the middle layer of the object, and the long wavelength area signifies the information concerning the deep layer of the object. Thus, the normalization unit 116, the falsely-colored processing unit 117, the first output unit 118 and the second output unit 119, for example, function as an output signal calculation unit which calculates the output signal as an identification result of the subject to be the identification object based on the correlation coefficients for each wavelength area calculated by the correlation coefficient calculation unit 131.

Meanwhile, the first output unit 118 and the second output unit 119 are not limited to the display device such as the liquid crystal display, and a form in which the frame signals are recorded to be stored sequentially into the recording medium such as the hard disk or memory card is possible.

Figure 29:
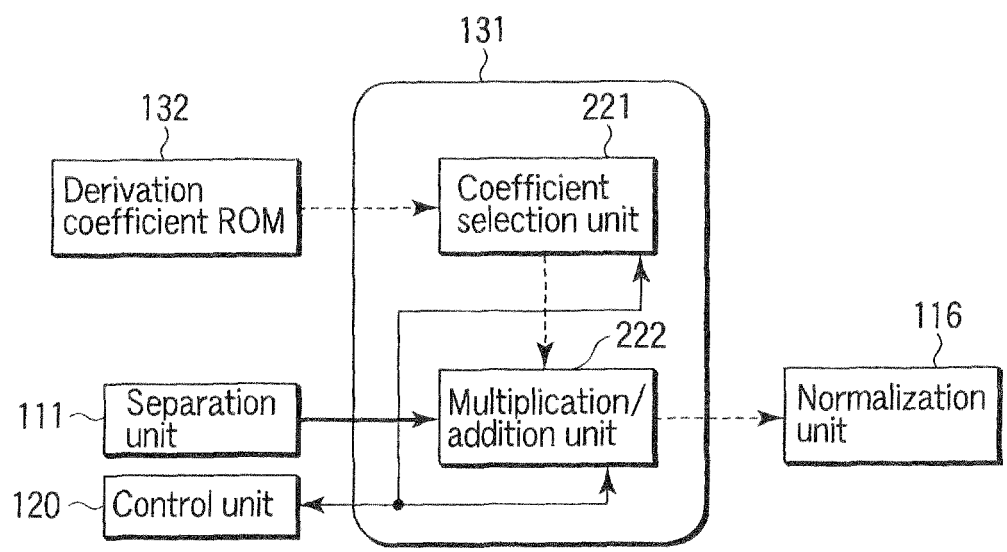
FIG. 29 is a view showing one example of a configuration of a correlation coefficient calculation unit.

The correlation coefficient calculation unit 131, as shown in FIG. 29, is composed of a coefficient selection unit 221 and a multiplication/addition unit 222. Here, the derivation coefficient ROM 132 is connected to the multiplication/addition unit 222 via the coefficient selection unit 221. The separation unit 111 is connected to the multiplication/addition unit 222. The multiplication/addition unit 222 is connected to the normalization unit 116. The control unit 120 is connected bi-directionally to the coefficient selection unit 221 and the multiplication/addition unit 222.

The coefficient selection unit 221 receives the information of the subject to be the identification object in the image acquisition condition set via the external interface unit 121 from the control unit 120, and reads the derivation coefficients for deriving the correlativity between the spectral characteristics of the subject to be the identification object and the image signal from the derivation coefficient ROM 132 based on the information. Thus, the derivation coefficient ROM 132 and the coefficient selection unit 221 function as a derivation coefficient acquisition unit which performs an acquisition of the derivation coefficient for the each wavelength area. The derivation coefficient ROM 132 records the respective elements of the inverse matrix $M^{-1}$ of the system matrix indicated in the formula (1) or the formula (2) as the derivation coefficient. Meanwhile, in the present embodiment, since three wavelength areas are assumed, the number of the inverse matrix $M^{-1}$ of the system matrix becomes three. Additionally, as to a size of the inverse matrix of the system matrix, the size of the short wavelength area and the long wavelength area results in 3×3, and size of the middle wavelength area results in 5×5. Additionally, the present embodiment is premised that, in the microscope, the spectral characteristics concerning the color imaging system provided for the image acquisition of the subject, and the spectral characteristics concerning the illumination light used in the image acquisition of the subject by the color imaging system are fixed. In this case, since the inverse matrix $M^{-1}$ of the system matrix obtained finally is fixed, it is possible to eliminate processes of calculation indicated in the formula (1) or formula (2), and the formula (3) or formula (4), so that the only inverse matrix $M^{-1}$ may be recorded.

Meanwhile, as to the base vector based on the known spectral characteristics of the subject to be the identification object, preliminarily assumed kinds are prepared, and the inverse matrix $M^{-1}$ of the plurality of system matrices should be recorded. The derivation coefficients are transferred to the multiplication/addition unit 222.

The multiplication/addition unit 222, based on the control of the control unit 120, reads the derivation coefficient from the coefficient selection unit 221, and the image signal in wavelength area from the separation unit 111 for each pixel unit respectively. After that, the weighting coefficients are determined as indicated in the formula (5) or formula (6). The weighting coefficients result in correlation coefficients representing correlation between the spectral characteristics of the subject to be the identification object and the image signal. The correlation coefficients are transferred sequentially to the normalization unit 116.

Meanwhile, in the present third embodiment, the configuration is such that, in order to improve accuracy of the middle wavelength area, five kinds of color signals are used for only the middle wavelength area, while three kinds of color signals are used for the short wavelength area and the long wavelength area. However, it is not limited to such a configuration. For example, a configuration in which the whole wavelength areas have three kinds of color signals is possible, and a configuration in which a specific wavelength has four kinds or five kinds of color signals is possible. This can be set arbitrarily while considering speed up of the processing speed and accuracy improvement of the signal processing.

As described above, according to the present third embodiment, the correlation coefficient between the known spectral characteristics of the subject to be the identification object taking the value proportional to existence of the subject to be the identification object and the image signal, is determined independently for each wavelength area from the derivation coefficients based on the known spectral characteristics of the subject to be the identification object with the spectral characteristics known, and then, based on those correlation coefficients, the output signal as identification result of the subject to be the identification object with the spectral characteristics known is calculated. Thus, in the present third embodiment, it is possible to calculate the correlation coefficients taking the value proportional to existence of the subject to be the identification object, by using the derivation coefficients based on the spectral characteristics of the subject to be the identification object. Consequently, it is not necessary to perform the signal processing including errors unlike the conventional approximation by a least squares method. Therefore, since occurrence of the errors caused by the signal processing is small, identification of the subject to be the identification object with high reliability becomes possible.

Additionally, since the ordinary illumination light of the broadband is used, it is possible to suppress influence by the noise, and identification with stability becomes possible.

Further, since calculation of the correlation coefficient from the derivation coefficients is easy, and the output signal is directly calculated from the correlation coefficient, high speed processing and low cost processing become possible.

Further, since the signal processing is performed independently for the each image signal of the specific wavelength area, it becomes possible to obtain information of the required depth in such a manner that, for example, the blood vessel of the surface layer can be identified from the image signal of certain wavelength area, for example, the short wavelength area, and the blood vessel of the deep layer can be identified from the image signal from the another wavelength area, for example, long wavelength area.

Additionally, in the present third embodiment, since the output signal is determined by normalizing the correlation coefficients concerning the derivation coefficient, it is possible to obtain highly accurate output signal concerning existence of the identification object.

Furthermore, since independent color is assigned for each wavelength area, resolution to information of each wavelength area, that is, resolution to information of each depth is improved, so that highly accurate identification becomes possible.

Additionally, since the image signal subjected to the ordinary processing is output independently, the whole image signal can be recognized easily, so that operability for the user is improved.

Further, since the image signals of the respective wavelength areas are constituted from the plurality of color signals being continuous in the wavelength direction, acquisition of the derivation coefficient for each wavelength area becomes easy. Error occurrence caused by the signal processing in the image signal of the respective wavelength areas becomes small as compared with the case constituting the image signal of the respective wavelength areas from the color signals being discontinuous in the wavelength direction, and accordingly the identification with high reliability becomes possible.

Additionally, in the present third embodiment, since the plurality of color signals can be obtained in a time division manner, it is possible to obtain the color signals using the whole pixels of the image acquisition element, and thus it becomes possible to perform identification with superior resolution.

Meanwhile, in the description of the above third embodiment, although configuration is such that still image processing according to the microscope is performed, it is not limited to such a configuration. If the spectral characteristics concerning the color imaging system and the spectral characteristics concerning the illumination light used in the image acquisition of the subject are fixed, like the first and second embodiments, it becomes possible to apply to the video image processing such as the endoscopes of a field-sequential method. On the contrary, a configuration in which the first and second embodiments are applied to the still image processing is possible.

Further, it is also possible to perform the processing by acquiring the image signal and the accompanying information from the recording medium, in which the image signal acquired by the separate image acquisition unit is made non-processed Raw data form, and the accompanying information concerning the image acquisition condition such as subject to be the identification object is recorded in the header unit. Additionally, like the first and second embodiments, the third embodiment can be applied to the configuration for obtaining the plurality of color signals by using the single CCD, two CCDs or three CCDs.

Modified Example 1

Additionally, in the third embodiment, the configuration is such that the ordinary color image signal is indicated on the second output unit 119, while the false color signal concerning existence of the identification object is indicated on the first output unit 118. However, it is not limited to such a constitution.

For example, as shown in FIG. 30, a configuration is possible in which the ordinary color image signal is subjected to the enhancement processing based on the correlation coefficients concerning the derivation coefficients to indicate as one output signal. FIG. 30 shows a configuration in which the normalization unit 116, the falsely-colored processing unit 117, the first output unit 118 and the second output unit 119 are eliminated from the configuration shown in FIG. 27, and the enhancement unit 125 and the output unit 126 are added thereto. The basic configuration is the same as that in FIG. 27, and the same name and reference number are assigned to the same configuration. Hereinafter, different parts will be explained.

The signal processing unit 112 and the correlation coefficient calculation unit 131 are connected to the enhancement unit 125. The enhancement unit 125 is connected to the output unit 126. The control unit 120 is connected bi-directionally to the enhancement unit 125 and the output unit 126. The ordinary color image signal is transferred to the enhancement unit 125 from the signal processing unit 112, and the correlation coefficients between the spectral characteristics of the subject to be the identification object and the image signal are transferred from the correlation coefficient calculation unit 131 to the enhancement unit 125.

In such a configuration, the enhancement unit 125, based on the control of the control unit 120, performs the enhancement processing based on the correlation coefficients transferred from the correlation coefficient calculation unit 131, for the ordinary color image signal transferred from the signal processing unit 112. As the enhancement processing, the saturation enhancement processing is assumed as shown in FIG. 18 in the second embodiment, in which these enhancement amounts are implemented with the form proportional to the correlation coefficients. The ordinary color image signal after enhancement processing is transferred to the output unit 126.

For this reason, only existence area of the subject to be the identification object such as oxyhemoglobin is enhanced, so that it becomes possible to improve the recognition ability. Since the enhancement processing also can be performed independently for each wavelength area, resolution for the information of the respective wavelength areas, that is, the information of the respective depths is improved, so that the identification with high accuracy becomes possible. Additionally, also concerning an area where the subject being the identification object does not exist, that is, existence area of the subject other than identification object, since the color image signal subjected to the ordinary processing are output, recognition of the whole image signal becomes facilitated, so that operability for the user is improved.

Modified Example 2

Additionally, in the third embodiment, although the processing by the hardware is premised, it is not limited to such a configuration. For example, a configuration is possible in which the image signal from the CCD 101 is made non-processed Raw data form, and the image acquisition conditions such as the subjects to be the identification object are output as the header information from the control unit 120, and subsequently, the image signal and header information are input to the computer (not illustrated) to be processed by the software.

Figure 31:
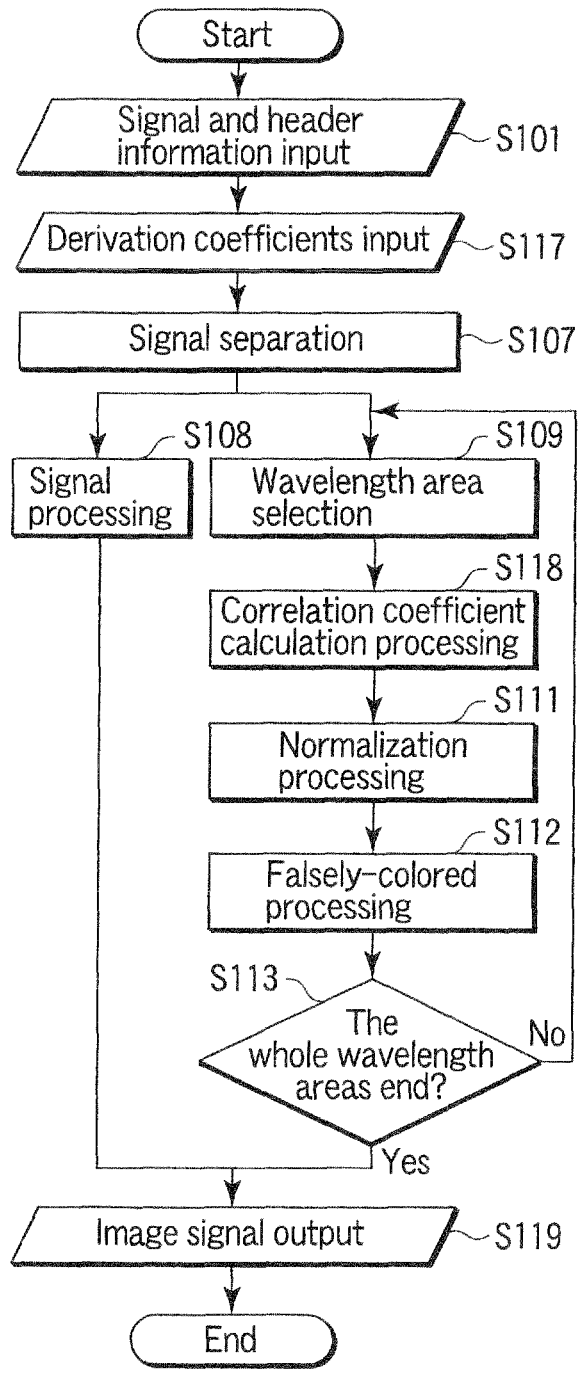
FIG. 31 is a view showing a flowchart concerning software processing of the signal processing in the modified example 2 of the third embodiment.

Hereinafter, referring to FIG. 31, software processing of the signal processing with the computer (not illustrated) will be explained. Additionally, concerning the same processing step as that in the signal processing flowchart in the first embodiment shown in FIG. 10, the same reference step number is assigned.

The computer operates in accordance with a signal processing program recorded in a computer readable medium (not illustrated). That is, first, the computer inputs the image signals and the header information concerning the image acquisition condition such as the subject to be the identification object (step S101), and inputs the plurality of derivation coefficients (step S117). Here, the derivation coefficients are input by reading out from the recording medium provided for the computer or the detachable recording medium, or reading via the network.

Figure 28:
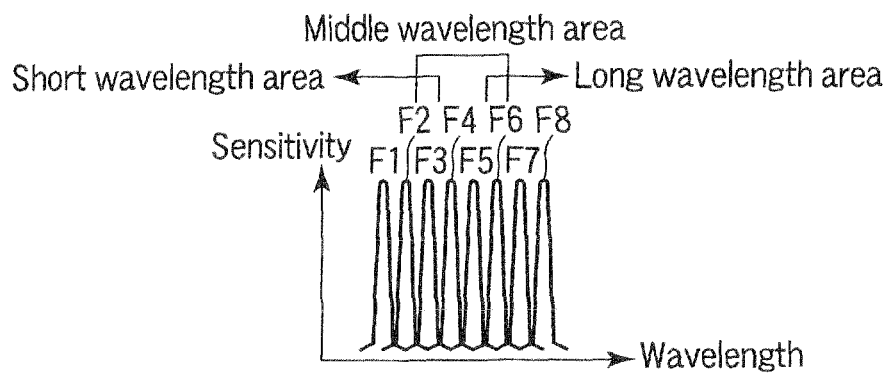
FIG. 28 is a view showing the spectral characteristics of respective color filters in a rotation filter.

Next, as shown in FIG. 28, the image signals composed of the color signals belonging to three wavelength areas of the short wavelength area, the middle wavelength area and the long wavelength area, and the image signal composed of the color signals for generating the ordinary color image signal are separated from the input image signal (step S107). Then, the ordinary color image signal is generated by performing the signal processing such as known gradation processing or enhancement processing for the image signal composed of the color signals for generating the ordinary color image signal (step S108).

Additionally, one wavelength area is selected in parallel with the signal processing of step S108 (step S109), and the computer calculates the correlation coefficient between the known spectral characteristics of the subject to be the identification object and the image signal, based on the input derivation coefficients by performing the correlation coefficient calculation processing as described later in detail, for the image signal composed of the color signals belonging to the selected wavelength area (step S118). Then, the computer normalizes the correlation coefficient (step S111), and generates the false color signal by assigning independent color for each wavelength area concerning the normalized correlation coefficient (step S112).

After that, whether the processing concerning the whole wavelength areas is completed is judged (step S113), returning to the S109 when not being completed to repeat the processing.

Thus, if the processing is completed concerning three wavelength areas of the short wavelength area, the middle wavelength area, and the long wavelength area, it is judged that the processing concerning the whole wavelength areas is completed in step S113. In that case, both the ordinary color image signal and the false color signal concerning existence of the identification object are output independently on the display monitor (not illustrated) connected to the computer (step S119), to terminate.

Figure 10:
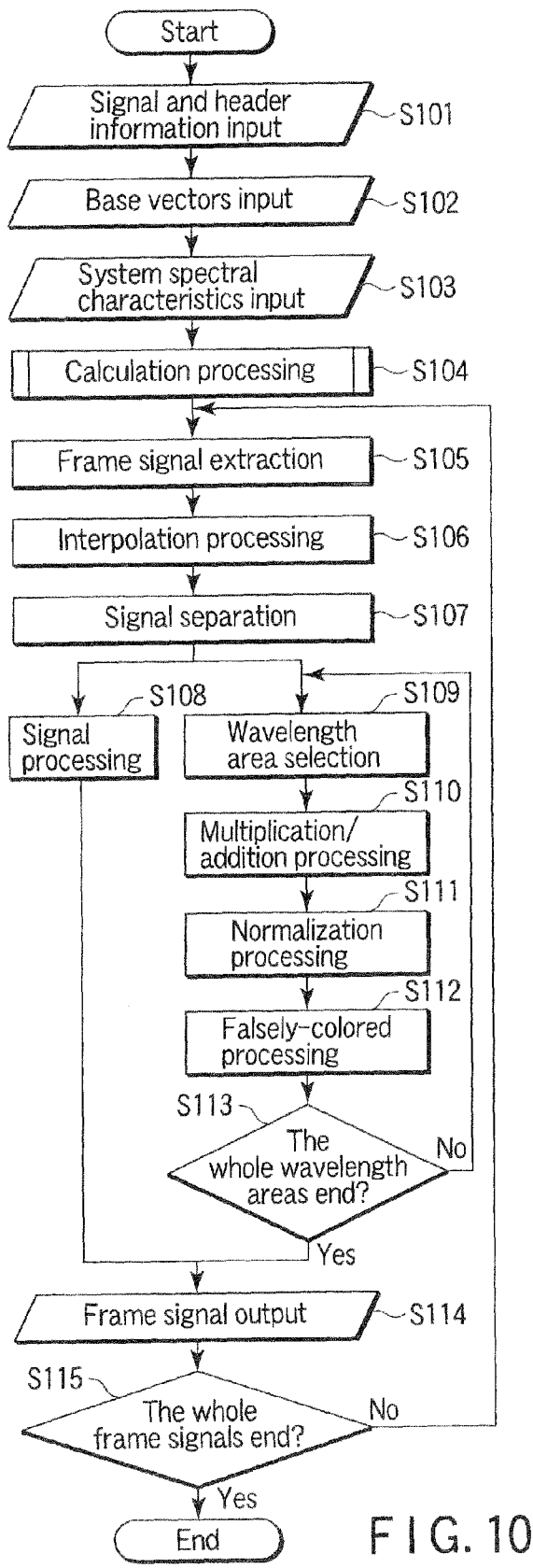
FIG. 10 is a view showing a flowchart concerning software processing of the signal processing in a modified example 3 of the first embodiment.
Figure 25:
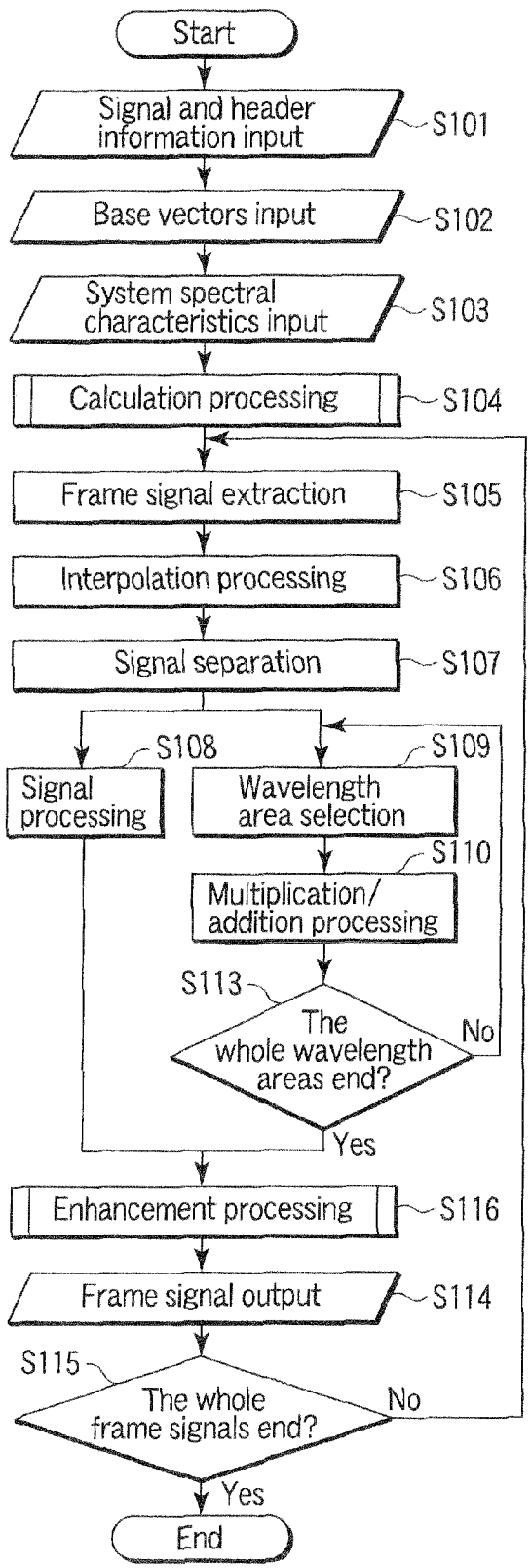
FIG. 25 is a view showing a flowchart concerning software processing of the signal processing in the modified example 2 of the second embodiment.

Meanwhile, in the case of the microscope, since the still image, not the video image, is handled, it is not necessary to perform judgment whether the whole frame signals are completed as shown in FIG. 10 or FIG. 25.

Figure 32:
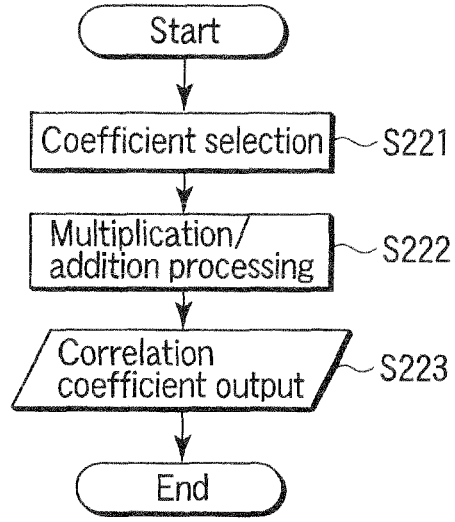
FIG. 32 is a view showing a flowchart concerning enhancement processing.

The correlation coefficient calculation processing in step S118 is performed as shown in FIG. 32.

First, the derivation coefficient is selected from the plurality of derivation coefficients input in step S117, based on the subject information to be the identification object among the header information input in step S101 (step S221). Then, the correlation coefficient is calculated based on the derivation coefficient as indicated in the formula (5) or formula (6) (step S222), and subsequently, the calculated correlation coefficient is output (step S223).

As described above, although the present invention has been explained based on the embodiments, the present invention is not limited to the embodiments, and it is obvious various kinds of modifications or applications are possible within the scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A signal processing system comprising:
   a base vector acquisition unit configured to perform an acquisition of a base vector based on spectral characteristics of a subject to be an identification object with spectral characteristics known;
   a separation unit configured to separate an image signal, which is composed of M kinds of color signals obtained by a color imaging system provided for subjects including the subject to be the identification object, into image signals of N kinds of wavelength areas, M and N being natural numbers, $M \geq 3$, $M>N$;
   a system spectral characteristics acquisition unit configured to perform an acquisition of spectral characteristics of an image acquisition system including spectral characteristics concerning the color imaging system and spectral characteristics concerning illumination light used in image acquisition of subjects by the color imaging system;
   a calculation unit configured to calculate a weighting coefficient concerning the base vector for each said wavelength area, based on the image signals of the N kinds of wavelength areas separated by the separation unit, the base vector acquired by the base vector acquisition unit, and the spectral characteristics of the image acquisition system acquired by the system spectral characteristics acquisition unit; and
   an output signal calculation unit configured to calculate an output signal as an identification result of the subject to be the identification object with the spectral characteristics known, based on the weighting coefficient concerning base vector for each said wavelength area calculated in the calculation unit;
   wherein the output signal calculation unit includes:
      a normalization unit configured to normalize the weighting coefficient concerning the base vector for each said wavelength area calculated in the calculation unit;
      a falsely-colored processing unit configured to assign a respective independent color to the weighting coefficient concerning the base vector for each said wavelength area normalized by the normalization unit; and
      an output unit configured to synthesize the weighting coefficients concerning the base vector for the wavelength areas, falsely-colored by the falsely-colored processing unit, and output the synthesized weighting coefficients as the output signal.

2. The system according to claim 1, further comprising:
   an identification object selection unit configured to select one subject from among a plurality of subjects to be identification objects,
   wherein the base vector acquisition unit acquires the base vector based on the spectral characteristics of the one subject selected by the identification object selection unit.

3. The system according to claim 1, further comprising:
   a color imaging system selection unit configured to select one color imaging system and one illumination light from among a plurality of color imaging systems and a plurality of illumination light,
   wherein the system spectral characteristics acquisition unit acquires the spectral characteristics concerning the one color imaging system and the spectral characteristics concerning the one illumination light, which are selected by the color imaging system selection unit, as the spectral characteristics of the image acquisition system.

4. The system according to claim 1, wherein the base vector acquisition unit further acquires a base vector based on spectral characteristics of a subject other than the subject to be the identification object in addition to the base vector based on known spectral characteristics of the subject to be the identification object.

5. The system according to claim 1, wherein the calculation unit includes:
   a matrix calculation unit configured to calculate a system matrix concerning the image acquisition system, for each said wavelength area, based on the base vector based on known spectral characteristics of the subject to be the identification object acquired by the base vector acquisition unit, and the spectral characteristics of the image acquisition system acquired by the system spectral characteristics acquisition unit;
   an inverse matrix calculation unit calculate an inverse matrix of the system matrix for each said wavelength area calculated in the matrix calculation unit; and
   a multiplication/addition unit configured to calculate a weighting coefficient concerning the base vector based on known spectral characteristics of the subject to be the identification object, by performing multiplication/addition processing between the inverse matrix of the system matrix calculated in the inverse matrix calculation unit and the color signals included in the image signal of the wavelength area, for each said wavelength area.

6. The system according to claim 1, wherein the separation unit separates an image signal including a plurality of color signals for generating an ordinary color image signal, from the image signal composed of the M kinds of color signals obtained by the color imaging system, and the system further comprises a signal processing unit configured to calculate an ordinary color image signal from the image signal including the plurality of color signals for generating the ordinary color image signal separated in the separation unit.

7. The system according to claim 6, wherein the output signal calculation unit includes:
   a normalization unit configured to normalize the weighting coefficient concerning the base vector for each said wavelength area calculated in the calculation unit;
   a falsely-colored processing unit configured to assign a respective independent color to the weighting coefficient concerning the base vector for each said wavelength area normalized by the normalization unit;
   an output unit configured to synthesize the weighting coefficients concerning base vector for the wavelength areas falsely colored by the falsely-colored processing unit, and output the synthesized weighting coefficients as the output signal; and
   a second output unit configured to output the ordinary color image signal calculated by the signal processing unit as a second output signal.

8. The system according to claim 6, wherein the output signal calculation unit includes:
   an enhancement unit configured to perform an enhancement processing of the ordinary color image signal calculated by the signal processing unit, based on the weighting coefficient concerning the base vector for each said wavelength area calculated in the calculation unit; and
   an output unit configured to output the ordinary color image signal subjected to the enhancement processing by the enhancement unit as the output signal.

9. The system according to claim 1, wherein the separation unit separates the image signal from the color imaging system into image signals of the N kinds of wavelength areas, such that the image signal of each said wavelength area is constituted from color signals continuing in wavelength direction, in cases where the M kinds of color signals are arranged in wavelength direction based on a dominant wavelength in spectral characteristics of the M kinds of color signals.

10. The system according to claim 1, wherein there are at least four kinds of the color signals constituting the image signal from the color imaging system.

11. The system according to claim 1, wherein the color signals constituting the image signal from the color imaging system are generated by an image acquisition element used in the color imaging system.

12. The system according to claim 1, wherein the color signals constituting the image signal from the color imaging system are generated by illumination light used in image acquisition of subjects by the color imaging system.

13. A non-transitory computer readable medium storing a signal processing program for causing a computer to execute processes comprising:
   performing an acquisition of an image signal composed of M kinds of color signals obtained by a color imaging system provided for subjects including a subject to be an identification object with spectral characteristics known;
   performing an acquisition of a base vector based on spectral characteristics of the subject to be the identification object with spectral characteristics known;
   separating the acquired image signal into image signals of N kinds of wavelength areas, M and N being natural numbers, M≧3, M>N;
   performing an acquisition of spectral characteristics of an image acquisition system including spectral characteristics concerning the color imaging system and spectral characteristics concerning illumination light used in image acquisition of subjects by the color imaging system;
   calculating a weighting coefficient concerning the base vector for each said wavelength area, based on the separated image signals of the N kinds of wavelength areas, the acquired base vector, and the acquired spectral characteristics of the image acquisition system; and
   calculating an output signal as an identification result of the subject to be the identification object with the spectral characteristics known, based on the calculated weighting coefficient concerning base vector for each said wavelength area;
   wherein calculating the output signal comprises:
   normalizing the calculated weighting coefficient concerning the base vector for each said wavelength area;
   falsely coloring the normalized weighting coefficient concerning the base vector for each said wavelength area by assigning a respective independent color to the normalized weighting coefficient concerning the base vector for each said wavelength area; and
   synthesizing the falsely colored weighting coefficients concerning the base vector for the wavelength areas, and outputting the synthesized weighting coefficients as the output signal.

* * * * *